United States Patent
Rao et al.

(10) Patent No.: US 10,171,973 B2
(45) Date of Patent: Jan. 1, 2019

(54) METHOD AND SYSTEM FOR MTC EVENT MANAGEMENT

(71) Applicants: Jaya Rao, Ottawa (CA); Sophie Vrzic, Kanata (CA); Xu Li, Nepean (CA)

(72) Inventors: Jaya Rao, Ottawa (CA); Sophie Vrzic, Kanata (CA); Xu Li, Nepean (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/983,438

(22) Filed: May 18, 2018

(65) Prior Publication Data
US 2018/0270636 A1 Sep. 20, 2018

Related U.S. Application Data

(63) Continuation of application No. 15/040,379, filed on Feb. 10, 2016, now Pat. No. 9,992,609.

(60) Provisional application No. 62/169,410, filed on Jun. 1, 2015.

(51) Int. Cl.
*H04W 4/70* (2018.01)
*H04W 24/08* (2009.01)
*H04L 12/24* (2006.01)
*H04L 12/26* (2006.01)

(52) U.S. Cl.
CPC .............. *H04W 4/70* (2018.02); *H04L 41/06* (2013.01); *H04L 41/0654* (2013.01); *H04W 24/08* (2013.01); *H04L 43/04* (2013.01)

(58) Field of Classification Search
CPC ........ H04W 4/70; H04W 24/08; H04L 41/06; H04L 41/0654; H04L 43/04
See application file for complete search history.

(56) References Cited

U.S. PATENT DOCUMENTS

| 2013/0002413 A1* | 1/2013 | Du ........................ B60R 25/10 340/426.1 |
| 2016/0081039 A1* | 3/2016 | Lindoff .............. H04W 52/383 455/450 |
| 2016/0353493 A1* | 12/2016 | Vrzic .................... H04W 12/06 |

FOREIGN PATENT DOCUMENTS

WO 2014182692 A1 11/2014

* cited by examiner

*Primary Examiner* — Duc C Ho

(57) ABSTRACT

There is provided a method and system for management of Machine Type Communication (MTC) events. The system and method enables the detection of a state of the MTC event, correlating the state of MTC event with a Virtual Network Function (VNF) state of a VNF configured to mitigate the MTC event and transitioning the VNF to the VNF state which correlates with the MTC state. In this manner, the VNF can be in a configured and active state in advance of the MTC event reaching a critical state, thereby enabling mitigation of the MTC event prior to reaching the critical state.

12 Claims, 24 Drawing Sheets

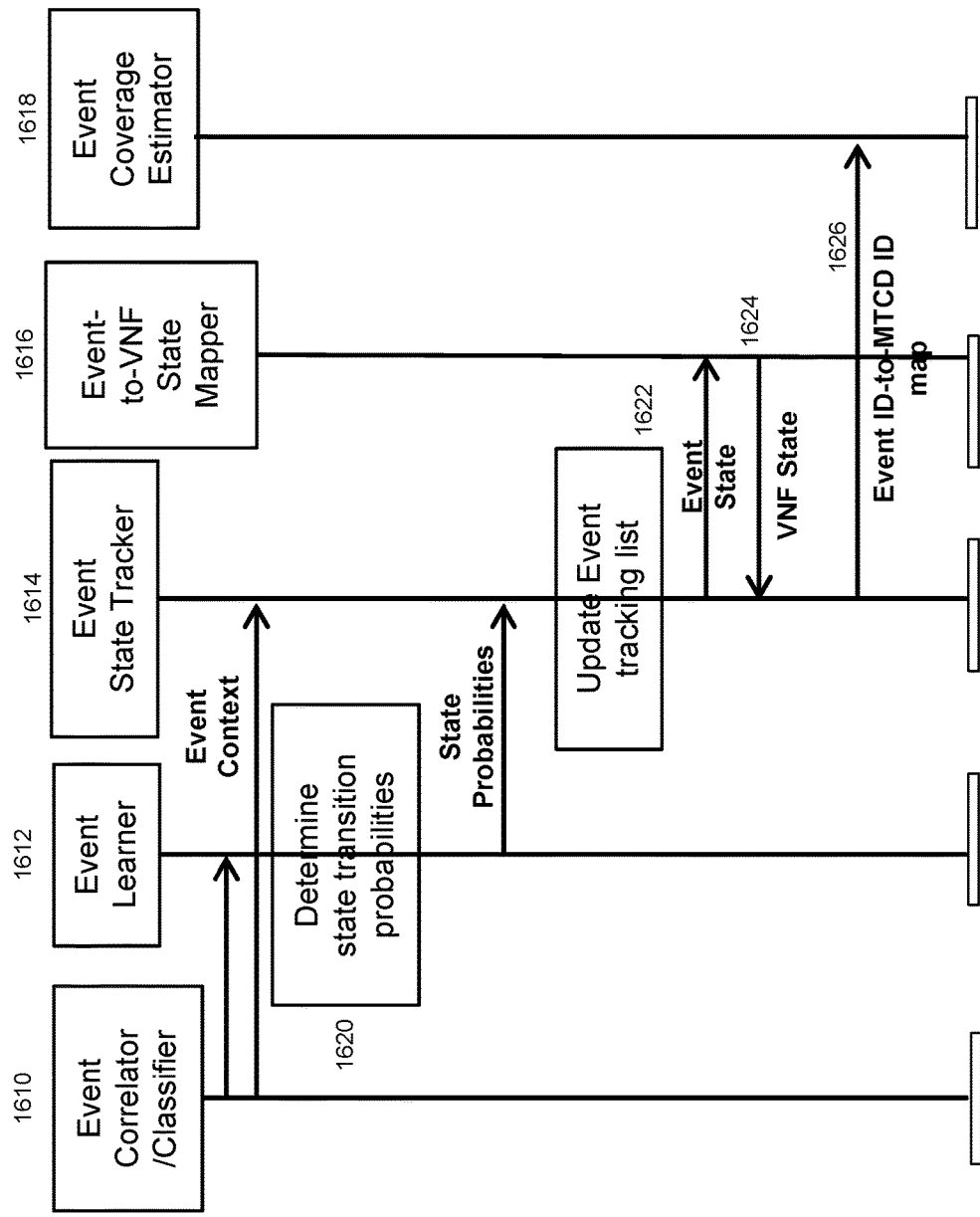

METHOD AND SYSTEM FOR MTC EVENT MANAGEMENT

CROSS-REFERENCE TO RELATED APPLICATIONS

This application is a continuation of U.S. patent application Ser. No. 15/040,379, filed Feb. 10, 2016 which claims the benefit and priority of U.S. Provisional Application No. 62/169,410, filed Jun. 1, 2015. The foregoing applications are incorporated by reference herein in their entirety.

FIELD OF THE INVENTION

The present invention pertains to the field of wireless communication and in particular to the management of Machine Type Communication (MTC) events.

BACKGROUND

Machine Type Communication (MTC) is an inter-device communication enabling technology facilitated by a network. An MTC service, interlinking the MTC devices (MTCDs) and a remotely located Application Server (AS), can be offered via a telecommunication network including Base Stations (BSs) and core network elements.

In addition, an MTC event can be defined as a change in the physical environment, for example a power surge, perimeter intrusion and the like, which is of interest to an MTC service. A MTC event can be detectable and/or acted upon by certain service specific entities, for example an actuator.

In order to support certain MTC service functionalities requiring in-network data processing, a Service Specific Serving Gateway (s-SGW) is necessary. For example, in a mission critical MTC service, for example an electric power distribution grid (e.g. Smart Grid) tele-protection, it is necessary to have a clear visibility and proximity to the MTC event locations to facilitate faster detection, analysis and response. As such, a Command and Control (CnC) function to mitigate the event criticality needs to be one of the functions of the s-SGW. The efficient, effective and/or economic provisioning and enablement of this type of CnC functionality proximate to the MTC event can be a problem.

Therefore there is a need for a method and apparatus for MTC event management that is not subject to one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a method and system for Machine Type Communication (MTC) event management. In accordance with an aspect of the present invention, there is provided a method for management of an MTC event, which includes receiving data indicative of a state of the MTC event. The method further includes mapping of the state of the MTC event with a Virtual Network Function (VNF) state of a VNF configured to mitigate the MTC event and sending instructions to transition the VNF to the VNF state which correlates with the MTC state.

In some embodiments, the method further comprises correlating MTC events within a network which involves analyzing MTC event related data from plural MTC devices and assessing a degree of similarity in the MTC event related data. Based on the degree of similarity, MTC event identifiers can be defined and the state of each of the MTC events can be determined.

In accordance with another aspect of the present invention, there is provided a system for MTC event management. The system includes a mapper configured to receive data indicative of a state of the MTC event and to correlate the state of the MTC event with a Virtual Network Function (VNF) state of a VNF configured to mitigate the MTC event. The system also includes a trigger generator configured to relay instructions for transitioning the VNF to the VNF state which correlates with the state of the MTC event.

In some embodiments, the system further comprises a correlator configured to correlate MTC events within a network which involves analyzing MTC event related data from plural MTC devices and assessing a degree of similarity in the MTC event related data Based on the degree of similarity, MTC event identifiers can be defined and the state of each of the MTC events can be determined.

BRIEF DESCRIPTION OF THE FIGURES

Further features and advantages of the present invention will become apparent from the following detailed description, taken in combination with the appended drawings, in which:

FIG. 16 illustrates interactions between several components of the MTC event management system according to embodiments of the present invention.

It will be noted that throughout the appended drawings, like features are identified by like reference numerals.

DETAILED DESCRIPTION OF THE INVENTION

Definitions

Figure 1:
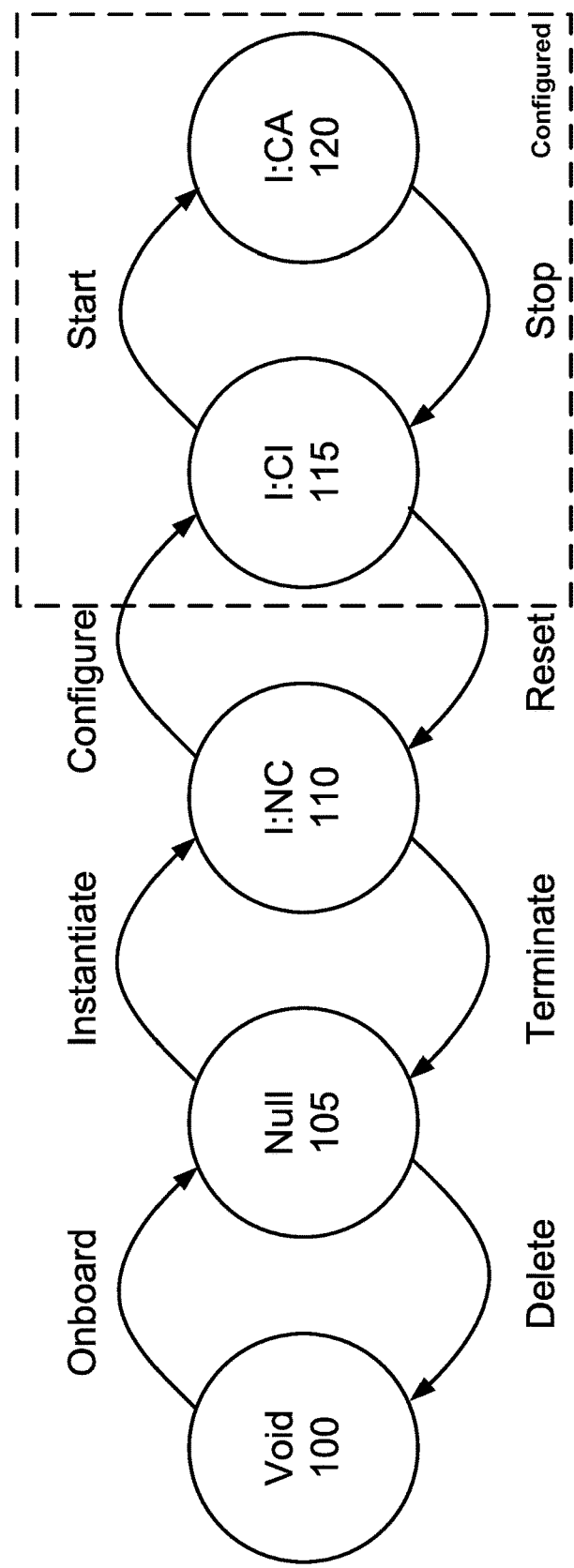
FIG. 1 illustrates a lifecycle of a Virtual Network Function (VNF).

The term "Virtual Network Function" corresponds to a function enabling operation of a communication network, such as routing, switching, gateways, firewalls, load balancers, servers, mobility management entities, and the like. The function is virtualized in the sense that it may utilize a set of virtual resources, such as computing, storage and networking resources, rather than utilizing hardware resources directly or dedicated hardware resources. As such, Virtual Network Functions may be instantiated on an as-needed basis using available virtual resources.

The term "Software Defined Topology" (SDT) corresponds to a technology by which service-specific network logical topologies may be defined. SDT may be used to define Virtual Function Point of Presence (PoP) and the logical connections between Virtual Functions. SDT may also be used to define logical connections between Virtual Function PoPs and corresponding service traffic sources and/or service traffic destinations.

The terms "MTC event" and "event" are interchangeably used to define a change in the environment in which a MTC device is operating. For example it can be a change in the physical environment, for example a power surge, perimeter intrusion or the like, which can be of interest to an MTC service.

Network Function Virtualization (NFV) is a technological paradigm which provides a mechanism to flexibly instantiate and manage network functions. The NFV framework includes NFV infrastructure which includes hardware resources, such as computing, storage and networking resources, a virtualization layer, and virtual computing, storage and networking resources. Virtualized Network Functions, such as software implementations of network functions, are capable of running over the NFV infrastructure. NFV management and orchestration is also provided, which covers the orchestration and lifecycle management of physical and/or software resources that support the infrastructure virtualization, and the lifecycle management of Virtual Network Functions (VNFs).

In a Network Function Virtualization (NFV) framework, the NFV Management and Orchestration (MANO) entity is used to instantiate the necessary network functional components in order instantiate the required VNFs. The NFV-MANO entity includes an Orchestrator function, a Virtual Network Function Manager (VNFM) function and a Virtual Infrastructure Manager (VIM) function. According to embodiments, the functionality of the Orchestrator function, VNFM function and VIM function can be as defined in ETSI GS NFV 001 and ETSI GS NFV 002, for example.

The VIM function is configured to manage the Network Function Virtual Infrastructure (NFVI) which can include physical infrastructure, virtual resources and software resources in a NFV environment. For example physical infrastructure can include servers, storage devices and the like and virtual resources can include virtual machines. According to embodiments, there can be plural VIM functions within a particular NFV architecture, wherein each VIM function is responsible for the management of its respective NFVI.

The VNFM function can be configured to manage the Virtual Network Functions (VNF) and can manage the lifecycle of the VNFs. For example the VNFM function can create, maintain and terminate VNF instances, which can be installed on virtual machines that are created and managed by the VIM function. The VNFM function can also be configured to provide fault, configuration, accounting, performance and security management (FCAPs) of the VNFs. In addition, the VNFM function can be configured to scale-up and scale-down one or more of the VNFs which can result in the scaling-up and scaling-down of the usage of the central processor(s) that is providing the computational power for the realization of the VNFs. In some embodiments, each VNFM function manages a separate VNF or a single VNFM function manages multiple VNFs.

The Orchestrator function can be configured to coordinate, authorize, release and engage the NFVI resources by interaction with the VIM function. The Orchestrator function further is configured to create end to end service between different VNFs by interaction with the VNFM function.

It is considered that using NFV to dynamically configure the network topology so that the Command and Control (CnC) functionality and Service Specific Serving Gateway (s-SGW), can be offered as a VNF to manage Machine Type Communication (MTC) events. The CnC and s-SGW can be instantiated at an NFV-enabled network node, for example a Point of Presence (PoP), which is located in close proximity to the MTC event. However, MTC events can transition from non-critical to critical levels either continuously or over a number of discrete steps, which can also be considered states. Furthermore, the range or coverage area, distribution, intensity and duration of the MTC events can generally be non-deterministic. In addition, while the CnC functionality is designed to mitigate the adverse effects of the MTC events, it is important to be aware of the rate at which the MTC events transition from non-critical to critical states. Moreover, if a CnC function is configured as a VNF, and it is activated only after the MTC event becomes critical, it may be too late for the CnC function to take any useful action in relation to management of the MTC event.

Furthermore, due to resource constraints, the CnC VNF cannot be instantiated and activated at every Point of Presence (PoP) at all times where the MTC events can potentially occur. As noted above, it requires a certain amount of non-negligible time from the moment a MTC event is detected to the time the VNF of the CnC function is instantiated and transitioned to an activated state. Moreover, the adaptation of the network topology, which includes the MTC devices, VNFs and the interconnecting logical links, based on the MTC events is non-spontaneous.

As such, it is desired to have a proactive mechanism that enables MTC event detection at nascent stages and exploits this information such that prior to the MTC event transitioning to the critical state, the CnC VNF is instantiated and in the fully active state, while remaining in a low resource consuming state otherwise. By linking the transitioning of states of the CnC VNF with the escalation of an MTC event, the use of network resources can be mitigated to when they are specifically needed, while also providing a CnC function for aiding with the mitigation of a MTC event on essentially an as needed basis.

The present invention provides a method and apparatus for management of a MTC event. The apparatus and method enables the detection of a state of the MTC event, mapping the state of MTC event with a VNF state of a VNF configured to mitigate the MTC event and transitioning the VNF to the VNF state which correlates with the MTC state. In this manner, the VNF can be in a configured and active state in advance of the MTC event reaching a critical state, thereby enabling mitigation of the MTC event prior to reaching the critical state.

In some embodiments, the apparatus and method further comprises correlating MTC events within the network which involves the process of analyzing the MTC event related data from different MTC devices and assessing the degree of similarity in the data, based on which an MTC event identifier and the state of the MTC event can be determined.

In some embodiments, the method and apparatus can allow timely response to the MTC events, which can enhance service related quality of service (QoS) and quality of experience (QoE), for example. Furthermore, in some embodiments, the apparatus and method can enable more efficient utilization of PoP resources, for example the use of data centers; can allow enhanced VNF lifecycle management and can provide foresight into resource usage for improving VNF scheduling performance; and can reduce and substantially minimize storage resource usage in the VNF catalogues. In some embodiments, the method and apparatus can allow for adaptation and learning of the MTC event context, for example developing MTC event state transition probabilities, thereby providing a means for improved accuracy relating to MTC event state identification and prediction.

According to embodiments, a method and apparatus for MTC event management, wherein the method and system can proactively identify and reserve resources for the VNF(s) in anticipation of the MTC events. The method and apparatus can provide mechanism to map the MTC event states to VNF lifecycle states and can include a technique to schedule VNF state transition based on MTC event state transition. In addition, also provided are mechanisms for managing the MTC events reported by the MTC devices. These mechanism can include one or more of determining MTC event coverage, determining/updating, for example adaptive learning, MTC event state transition probabilities, configuring a trigger to VNFM to change VNF state Interface/Interaction between VNF and Management and Orchestrator (MANO) components, and may include a procedure to manage VNF lifecycle in multiple candidate PoPs.

According to embodiments, the following defines a sequence of actions that can be taken for the management of a MTC event. A MTC event, as it occurs at the initial state, is sensed by the MTC device which generates measurement data and relays the packet(s) relating to the measurement data to the Virtual Specific Serving Gateway (v-s-SGW) via the associated base station (BS). Once the packet(s) are received at the v-s-SGW, their content is analyzed. According to embodiments, a response from the v-s-SGW, hosting the command and control (CnC) function, may not be necessary at this stage. The context of the MTC event, denoting the quantization of its measurements to a discrete state, for example, mapping based on certain thresholds, are relayed to the MTC Event Management Entity (EME). According to embodiments, the state mapping is done by the MTC Event Classifier which is a virtual network function component (VNFC) in the v-s-SGW. Additionally, the MTC Event Correlator VNFC within the v-s-SGW analyzes the packets received from associated MTC devices and performs data analysis to correlate the MTC events and assesses the degree of similarity between the reported MTC events. The correlation information is used to assign an MTC event identifier based on a predetermined policy, for example a predetermined rule set or a mathematical function. The correlation information may also be used by the CnC function to compute a response when the MTC events become critical. The MTC Event State Tracker VNFC inside the EME updates the MTC event tracking list using the MTC event context information and the state transition probability information acquired from the MTC Event Learner VNFC. Additionally, the state probabilities are also determined by the MTC event state tracker, along with the MTC event intensity. This intensity can be used to determine the amount of Network Function Virtualization Infrastructure (NFVI) resources to serve the MTC event.

According to embodiments, subsequently, the MTC Event Learner may determine the MTC event state transition probabilities from the network service request, actions taken by the v-s-SGW in response to the MTC event states and historical behaviour of the MTC events. The MTC Event-to-VNF state mapper maps the MTC event state to a v-s-SGW VNF state and based on the VNF transition time, for example as updated by the virtual network function manager (VNFM), computes the time to generate trigger to transition the VNF. In the meantime, the MTC Event Coverage Estimator compares the reports from other v-s-SGWs interfaced to the EME which provides the information related to the MTC event, for example the MTC event ID, and the reporting MTC device attributes, for example the MTC device ID and location, via the MTC event context information, to estimate the coverage area of the MTC events. The VNF trigger generator combines the MTC event coverage and the time to the VNF trigger to generate a trigger to the VNFM. The trigger can contain the information about the MTC event coverage, for example relating to geographical constraints, in addition to the type of the VNF state change required, for example instantiate, configure, start or the like. The VNF trigger generator will initially assess the trigger to determine if the request is to be sent to the Orchestrator. If the reported MTC event is new and unresolvable, for example not attended earlier and does not contain candidate VNFs, the trigger to determine the candidate locations to host the v-s-SGW VNFs is sent to the Orchestrator via the VNFM. In this initial trigger, for example, when a VNF is in the Void state, the Orchestrator determines the candidate Points of Presence (PoPs), for example using Software Defined Topology (SDT), and onboards the VNF image at the VNF catalogues associated with the identified PoPs. In the subsequent triggers, for example to change the VNF from to a subsequent state for example non-configured (I:NC), configured-inactivate (I:CI), or configured-activate (I:CA) or the like, for recurring MTC events with non-critical or critical states, the VNF trigger generator may either filter the candidate PoPs based on a policy, which can be based on Quality of Service (QoS), NFVI resource consumption or the like, and relay the request to the Orchestrator to identify a subset of the PoPs in which the VNFs reside for state change.

Virtual Network Function Lifecycle and Mapping with MTC Event State

A VNF comprises multiple states and can be transitioned from one state to another over its lifecycle. To transition the VNF between different lifecycle states, a VNF manager (VNFM) is required. The VNF states and the state transition triggers are illustrated in FIG. 1.

The Void state 100 indicates that the VNF software image is not present at a particular PoP. Once on-boarded to a VNF Catalog associated to the PoP, the VNF will be in the Null state 105, ready to be instantiated. An instantiated VNF can be one of the following states: Non-configured (I:NC) 110; Configured-Inactivate (I:CI) 115 or Configured-Activate (I:CA) 120. Each VNF state corresponds to different amounts of NFV Infrastructure (NFVI) resource usage. Furthermore, depending on the specific transition, the transition from one state to another state may require different configuration time durations.

Figure 2:
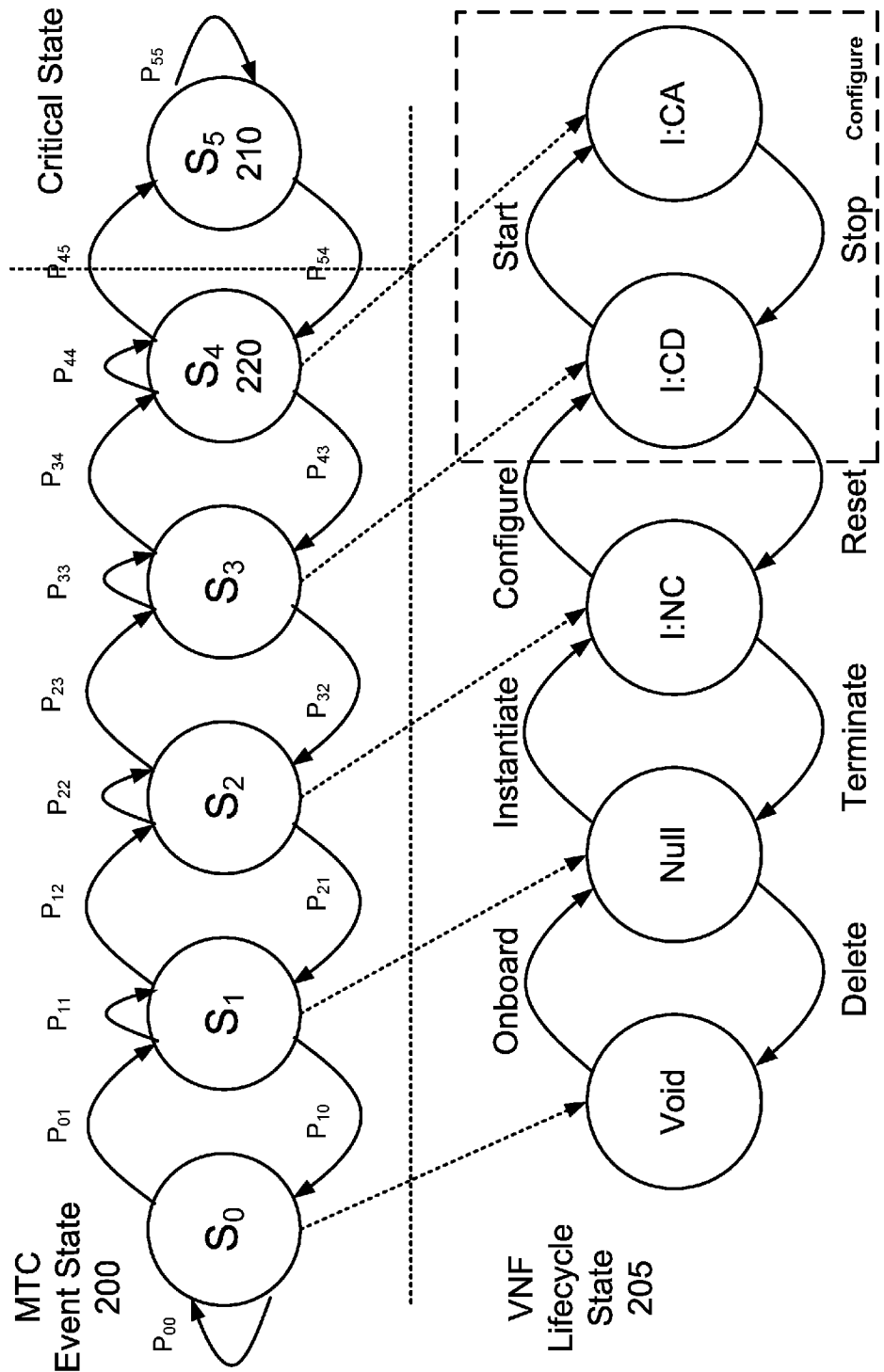
FIG. 2 illustrates a mapping of Machine Type Communication (MTC) event states with states of the VNF lifecycle, according to embodiments of the present invention.

FIG. 2 further illustrates a mapping between MTC event states 200 and VNF lifecycle states 205, according to embodiments of the present invention. An MTC event state model is illustrated as a Markov Chain and provides a set of statistical information which includes the state transition probabilities, for example as shown by $P_{01}$, $P_{12}$ and the like. For example, $P_{01}$ indicates the probability of a MTC event state transition to escalate from MTC event state 1 ($S_1$) to MTC event state 2 ($S_2$), likewise $P_{54}$ indicates the probability of a state transition to deescalate from MTC event state 5 ($S_5$) to MTC event state 4 ($S_4$). This model further provides the probability of an MTC event residing in a certain state k at time T, for example as shown by $P_{11}$, $P_{22}$ and the like. For example, $P_{11}$ indicates the probability of the MTC event state remaining at MTC event state 1 ($S_1$). In some embodiments, these probabilities can be determined in real time, and in other embodiments the probabilities can be provided by a service provider, for example probabilities of state transitions may be provided by a power company when the MTC devices are associated with a Smart Grid. From the statistical MTC event state information, a command to transition from one VNF lifecycle state to another can be proactively determined. For example, prior to a MTC event reaching the critical at MTC event state $S_5$, a trigger 215 can be generated at MTC event state $S_4$ 220 so that the CnC VNF can be set to the instantiated-configured-activate state, for example fully active, substantially just when necessary. This can enable improved utilization of NFVI resources by using MTC event dependent dynamic VNF lifecycle management.

Figure 3:
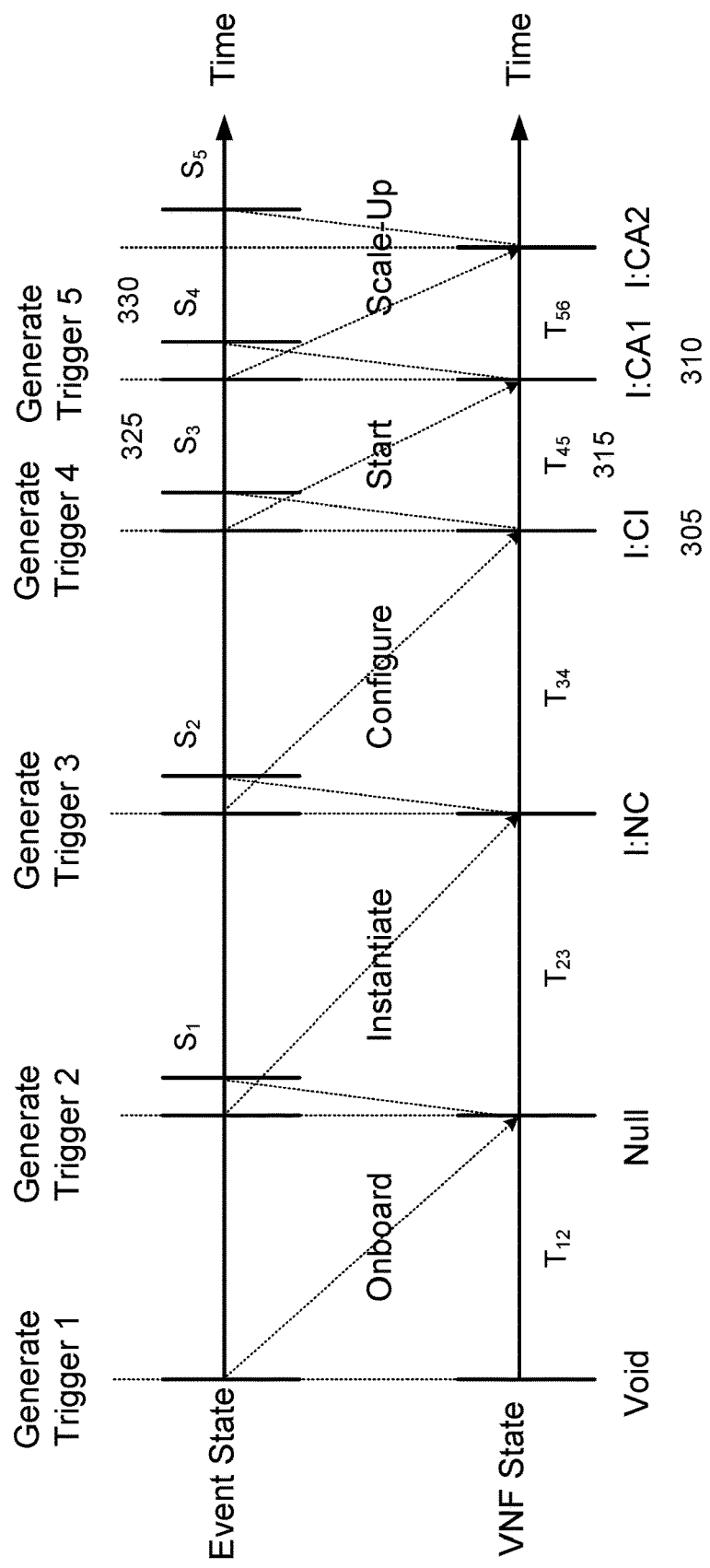
FIG. 3 illustrates a mapping of MTC event states including trigger points with states of the VNF lifecycle, according to embodiments of the present invention.

FIG. 3 illustrates a mapping between the MTC event state and VNF state and further illustrates an example of the VNF state change trigger timing. For example, the time required to transition the VNF state from I:CI state 305 to I:CA1 state 310 is defined as $T_{45}$ 315. Similarly, $T_{12}$ defines the time required for the VNF state to transition from a Void state to a Null state. Based on this, the trigger 320, for example the Start trigger, to change the VNF state is generated prior to MTC event state $S_3$ 325 so that substantially just before reaching MTC event state $S_4$ 330, the VNF is in I:CA1 state 310. In some embodiments, during MTC event state decrease, a trigger can activate a change in the VNF state just after a decrease in the MTC event state. As discussed with respect to FIG. 1 which defined the lifecycle of a VNF, the Void state indicates that the VNF software image is not present at a particular PoP. Once on-boarded to a VNF Catalog associated to the PoP, the VNF will be in the Null state, ready to be instantiated. An instantiated VNF can be one of the following states: Non-configured (I:NC); Configured-Inactivate (I:CI) or Configured-Activate (I:CA). The final transition for an instantiated VNF would be the be the scale-up of the activity of the VNF from Configured-Active level 1 (I:CA1) to Configured-Active level 2 (I:CA2). Each VNF state corresponds to different amounts of NFV Infrastructure (NFVI) resource usage. Furthermore, depending on the specific transition, the transition from one state to another state may require different configuration time durations.

Figure 4:
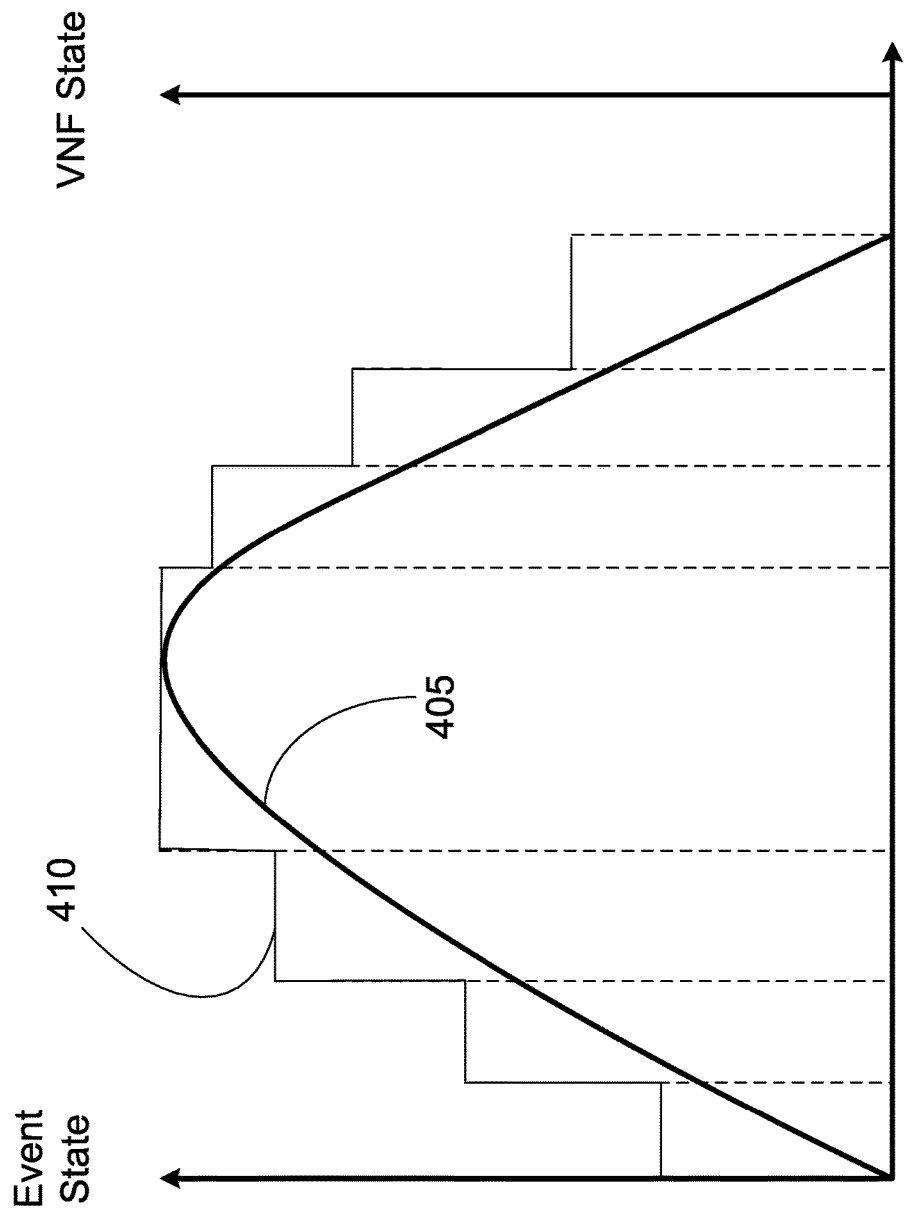
FIG. 4 illustrates an example of VNF state transitions relative the MTC event transitions including triggers according to embodiments of the present invention.

However, in some embodiments, as the MTC event state criticality decreases (e.g. $S_4 \rightarrow S_3$), the VNF trigger generation is delayed until the MTC event state reaches at least the next lower state, for example the MTC state decreases at least two states. This delay in the decrease of VNF state can allow for the substantial elimination of a ping-pong effect of VNF state during MTC event state decrease. For example, the VNF state transitioning back and forth between two adjacent states. This delayed transition in the VNF state is illustrated in FIG. 4, wherein the MTC event state 405 is illustrated in the curvilinear line while the VNF state 410 is illustrated by the step like transitional line.

According to embodiments, for establishing a virtual network on an NFV Infrastructure (NFVI), which can be adapted with the awareness of the MTC event states, the information contained in Network Service Request (NSR) prior to the service initialization may include the service request and the MTC event attributes. According to embodiments, the service request can include information relating to service traffic description, for example MTC device deployment locations, traffic characteristics and the like. The service request may include information relating to service function description, for example VNFs and their respective resource requirements, which may include computation, storage and network resources required. The service function description may define VNF instantiation constraints, which may relate to a maximum and/or minimum number of Points of Presence (PoPs). In some embodiments, the service request can include service traffic quality requirements, which may relate to traffic Quality of Service (QoS) requirements, for example, delay or rate or the like. Furthermore, the service traffic quality requirements may relate to service user Quality of Experience (QoE) requirements. According to embodiments, MTC event attributes can relate to MTC event states (non-critical to critical levels), thresholds to map measurement data to MTC event states. MTC event attributes can additionally include MTC event correlation related attributes, for example, attributes related to geographic parameters, or temporal parameters or the like or a combination thereof. In some embodiments, MTC event attributes can include MTC event state transition probabilities. In some embodiments, MTC event attributes can include MTC event state steady state probabilities.

According to embodiments, based on the NSR, the Orchestrator determines the PoPs for hosting the VNFs, for example hosting of the v-s-SGWs, MTC event management entity (EME) and the like. In some embodiments, this determination can be performed using techniques such as those defined by Software Defined Topology (SDT). However, alternate techniques for the determination of the PoPs can be used as would be readily understood by a worker skilled in the art of Network Function Virtualization (NFV) or similar.

In embodiments, where SDT is the applied technology, upon instructing the Virtual Infrastructure Manager (VIM) to allocate resources, the VNFM is instructed to instantiate the VNFs along with the SDN-Controller (SDN-C). Once the VNFs are instantiated, the SDN-C provisions the physical resources to associate the deployed MTC devices, which are interlinked via the base stations (BSs) to the v-s-SGW containing the application layer processing function, for example the Control and Command function (CnC). The v-s-SGWs are connected to the EME for supporting MTC event management. This configuration then forms the logical topology of the MTC service.

Figure 5:
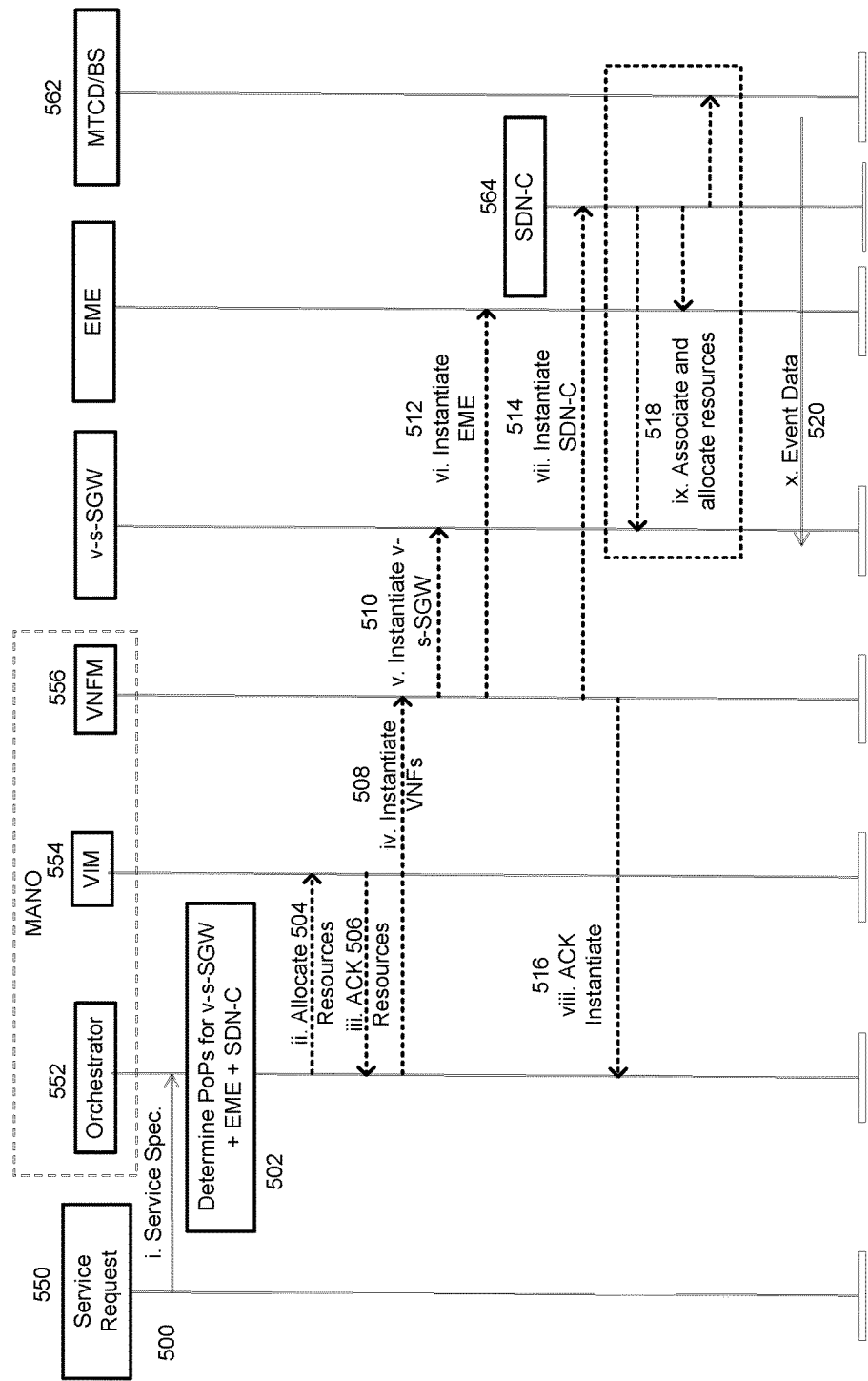
FIG. 5 illustrates a procedure for MTC service initialization on a Network Function Virtualization (NFV) infrastructure according to embodiments of the present invention.

FIG. 5 illustrates a procedure for MTC service initialization on an NFV infrastructure according to embodiments of the present invention. For initializing of a MTC service, the service requirements are specified in the Network Service Request (NSR) 550. With further reference to FIG. 5, the service specifications 500 are transmitted to the Orchestrator 552 which is part of the MANO and the Orchestrator determines 502 the Points of Presence (PoPs) for the v-s-SGW, EME and the SDN-C. The Orchestrator communicates with the VIM 554 in order to allocate resources 504 and the VIM can communicate an acknowledgement of these resources 506. For example, the VIM function is configured to manage the Network Function Virtual Infrastructure (NFVI) which can include physical infrastructure, virtual resources and software resources in a NFV environment. For example physical infrastructure can include servers, storage devices and the like and virtual resources can include virtual machines. According to embodiments, there can be plural VIM functions within a particular NFV architecture, wherein each VIM function is responsible for the management of its respective NFVI. The Orchestrator subsequently communicates with the VNFM 556 in order to instantiate the required VNFs 508. The VNFM 556 instantiates the v-s-SGW 510 and also instantiates the EME 512 and further instantiates the SDN-C 514. Upon the instantiation of each of these VNFs, the VNFM communicates an acknowledgement of these actions to the Orchestrator 516. The SDN-C 564 associates and allocates resources 518 between the v-s-SGW, EME and the MTC device/base station 562. The MTC event data is subsequently transmitted from the MTC device/base station to the v-s-SGW for subsequent actions to be performed, for example as discussed further herein.

MTC Event Management System

Figure 6:
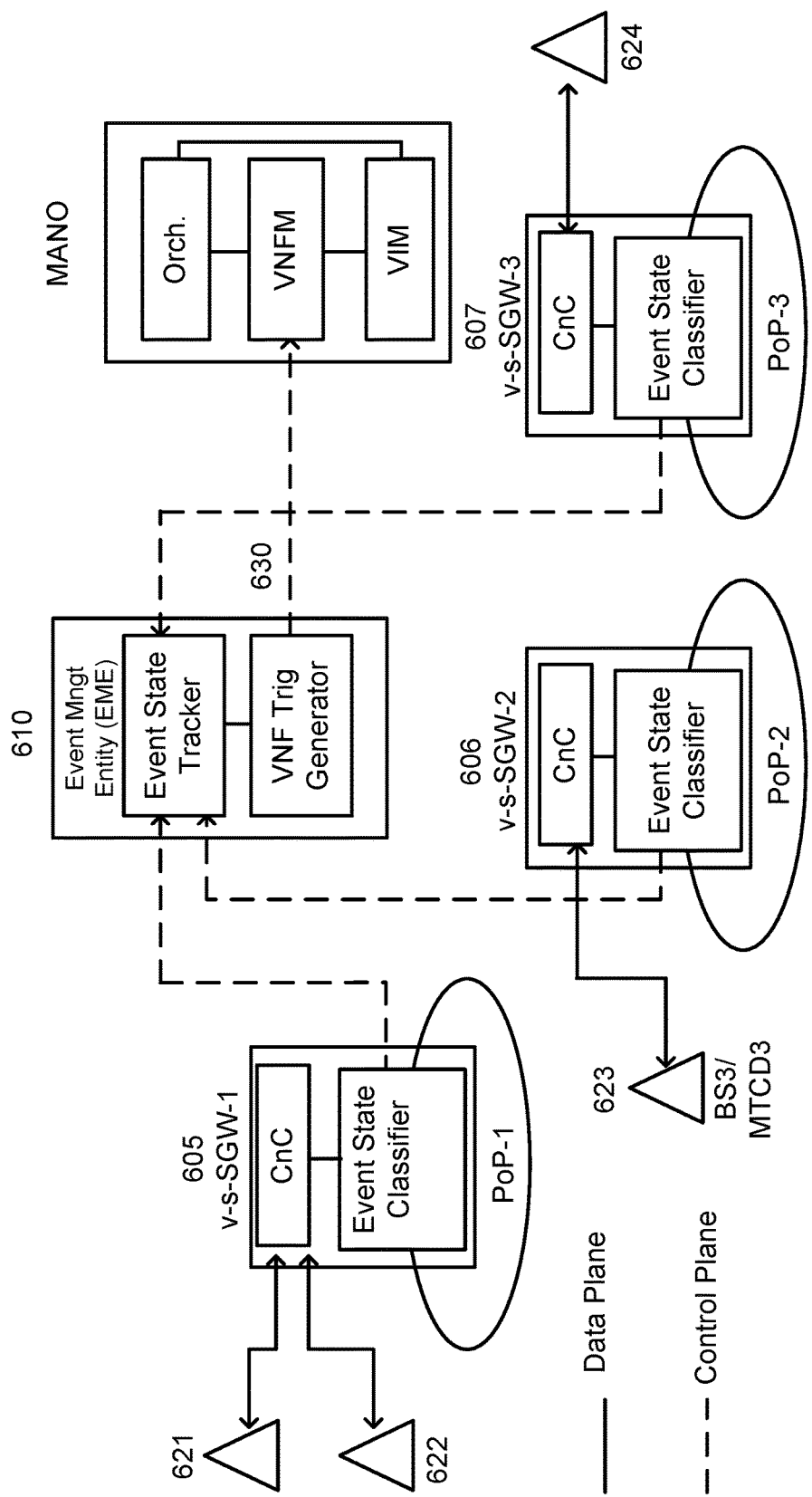
FIG. 6 illustrates a snapshot of the data plane and control plane in the logical topology of a mission critical MTC service according to embodiments of the present invention.

FIG. 6 illustrates a snapshot of the data plane and control plane in the logical topology of a mission critical MTC service, established after service initialization, and comprising v-s-SGWs 605, 606, 607 and the MTC Event Management Entity (EME) 610 according to embodiments of the present invention. The MTC events are sensed by the MTC devices 621, 622, 623, 624 which generate packets containing the MTC event related measurements. For example, the packets are forwarded from MTC device 621 and 622 to the v-s-SGW-1 605 for further processing, likewise from MTC device 624 to v-s-SGW-3 607. The v-s-SGW can include a Command and Control function (CnC) which proceses the measurement data and determines a response to same and provides this information to the Event State Classifier can perform quantization on measurement data for conversion into a state space, for example the state of the MTC event based on predefined thresholds relating to same. The information relating to the collected data relating to each of the MTC events (for example, MTC events reported to v-s-SGW-1, v-s-SGW-2 and v-s-SGW-3 and evaluated by the respective Event State Classifier) is then transmitted to the EME and in particular to the Event State Tracker. The Event State Tracker which is configured to maintain and update the MTC event context. For example upon an MTC event being updated as transitioning from MTC event state 1 ($S_1$) to MTC event state 2 ($S_2$), the Event State Tracker provides this information to the VNF Trigger Generator to determine if a trigger should be generated and transmitted to the VNFM of the MANO for transitioning the VNF configured to mitigate the MTC event to another state. The EME is a control plane function in-charge of tracking the MTC events reported at each v-s-SGW and generating the trigger 630 for adapting the data plane topology. The EME can be located in another PoP within the network or remotely at the MTC service application server.

Figure 7:
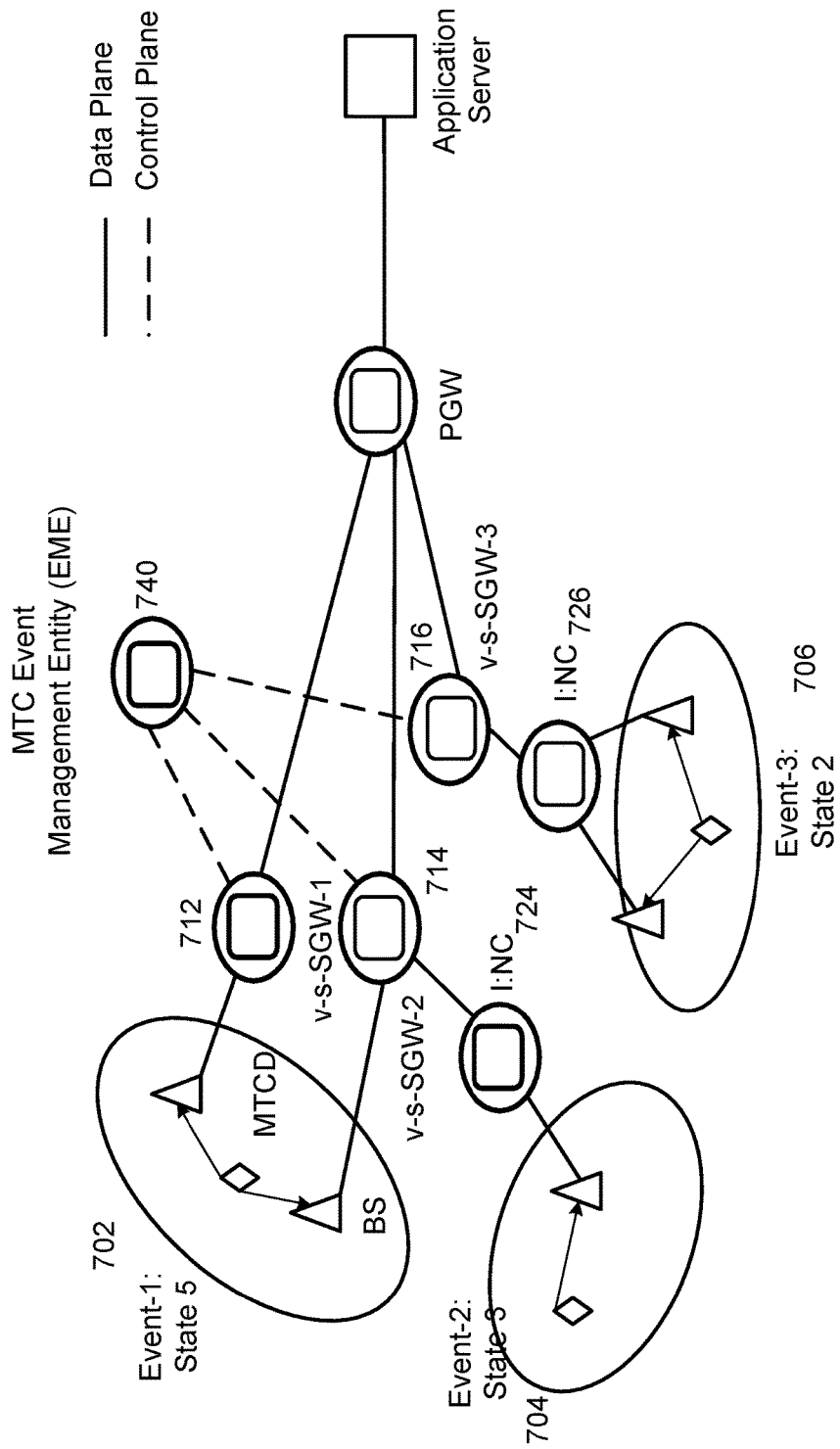
FIG. 7 illustrates an extended view of the network logical topology and the state of the MTC events and the Virtual Service Specific Serving Gateway (v-s-SGW) VNFs during service operation according to embodiments of the present invention.

FIG. 7 illustrates an extended view of the network logical topology and the states of the MTC events (MTC event-1 702, MTC event-2 704, MTC event-3 706) and the v-s-SGW VNFs (v-s-SGW-1 712, v-s-SGW-2 714, v-s-SGW-3 716) during service operation in an NFV enabled network. This figure further illustrates the connectively between components which is provided by the control plane and the data plane. It may be considered that critical MTC events, detectable and acted upon by MTC devices, are unpredictable and can occur with wide variations over temporal and geographic regions. Accordingly, it can be difficult to deterministically compute the MTC event attributes in advance. Consequently, assessing the PoPs and the activation status of the CnC virtualized network function which can process and mitigate the MTC events' criticality, can be challenging. According to embodiments of the present invention, the method and apparatus exploits the VNF lifecycles and probabilistic nature of the MTC events to effectively map the MTC events' states to the VNF state such that the CnC VNF can be proactively activated before the MTC events become critical and maintained in low resource states otherwise.

Having further regard to FIG. 7, v-s-SGW-1 712 and v-s-SGW-2 714, co-hosting the CnC function, are fully active (for example in a VNF state of I:CA) to attend to MTC event-1 702 which is in critical state, namely State 5 ($S_5$). Since MTC event-2 704 and MTC event-3 706 are non-critical, namely in State 3 ($S_3$) and State 2 ($S_2$), respectively, the required v-s-SGW VNFs 724, 726, for MTC event-2 and MTC event-3, respectively, can be placed in the instantiated-non-configured (I:NC) state thereby reducing NFVI resource usage. According to embodiments, depending on parameters that may include geography and the MTC event type, there can be interplay between MTC events which result in proximate VNFs to transition, even when an MTC event associated with that particular VNF, would not explicitly require the transition. For example, if MTC event-2 704 transitioned to a critical state, namely State 5 ($S_5$), the result of MTC event-1 702 and MTC event-2 704 both being in a critical state may result in the transition of the VNF 726 associated with MTC event-3 706 from the I:NC state to a configured-inactivate (I:CI) state. This overall control and coordination of the state transitions of the VNFs associated with v-s-SGW-1, v-s-SGW-1 and v-s-SGW-1 can be provided by the Event Management Entity (EME).

Figure 8:
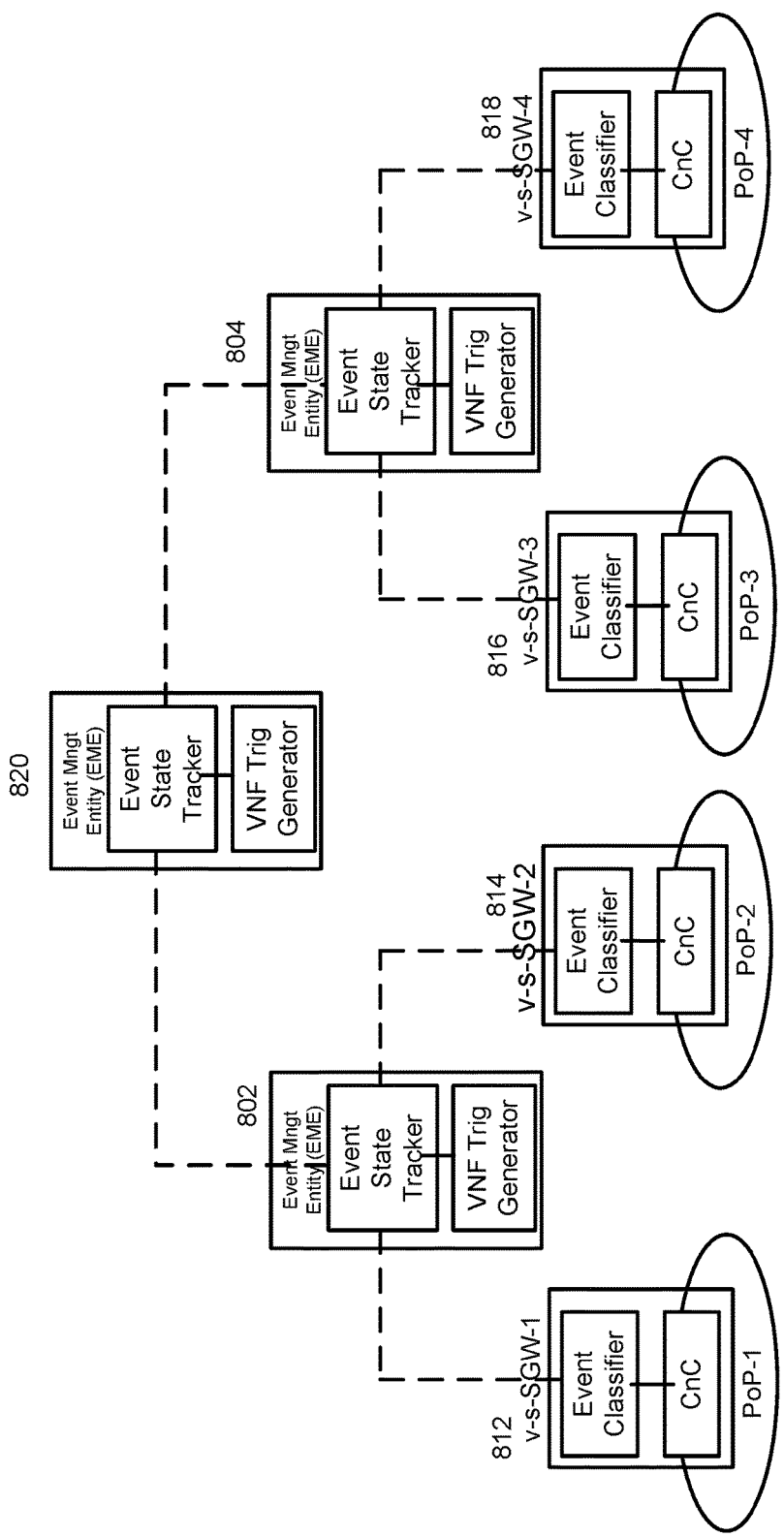
FIG. 8 illustrates the MTC Event Management Entity (EME) structured in a hierarchical manner according to embodiments of the present invention.

In some embodiments, the MTC Event Management Entity (EME) can be structured in a hierarchical manner and interfaced as illustrated in FIG. 8. In this example, each EME controls a region comprising of a set of v-s-SGWs, which contain the CnC function, and manages the MTC events within each region. Each EME is able to trigger the VNF state change within its region. This hierarchical structure may be necessary to support MTC services which can span over wide geographic regions where the MTC events can occur over wide areas with overlapping coverage between different EME regions. As illustrated EME 802 controls v-s-SGW-1 812 and v-s-SGW-2 814, while EME 804 controls v-s-SGW-3 816 and v-s-SGW-4 818. In this illustrated embodiment, EME 820 provides global control of the subordinate EMEs 802 and 804.

Figure 9:
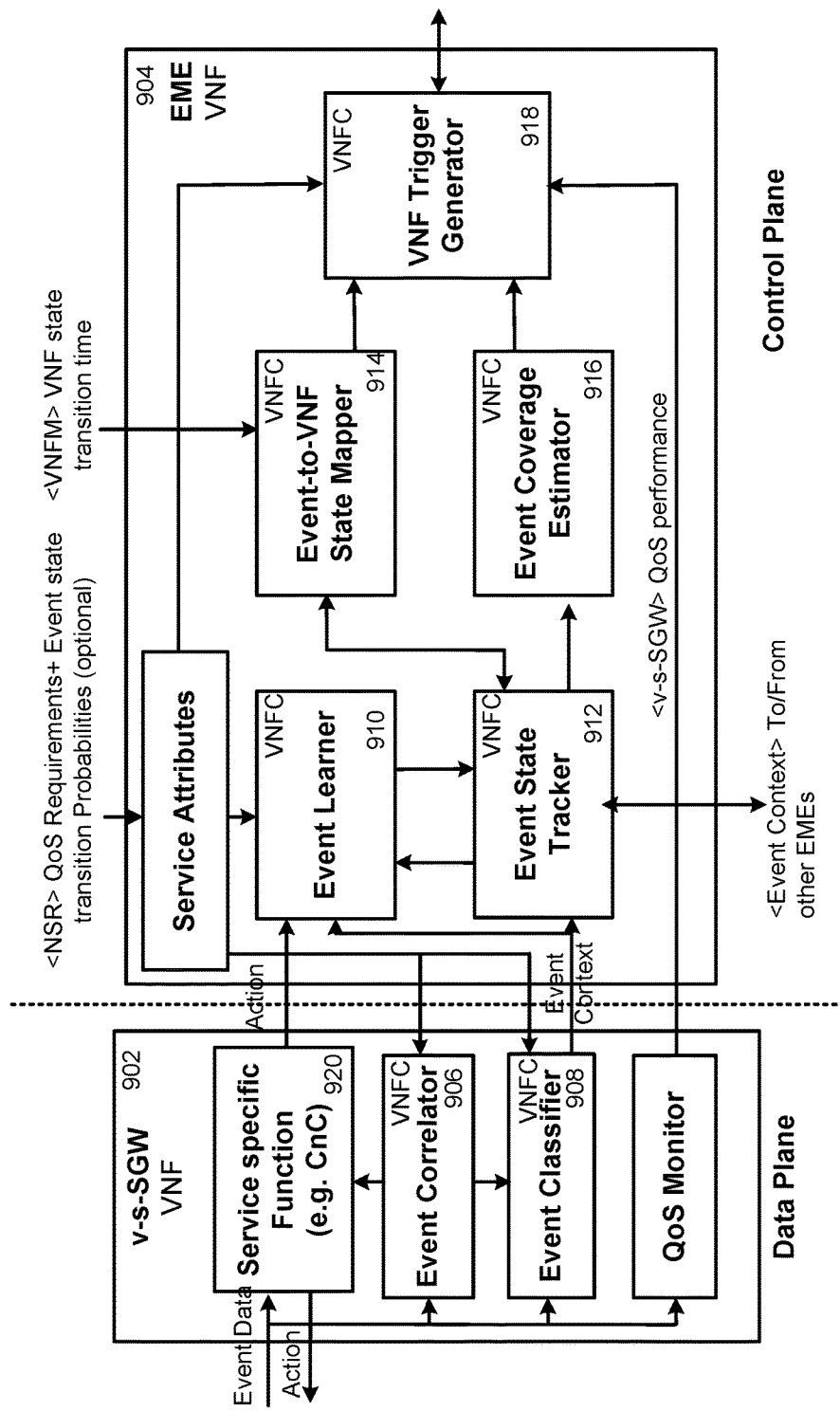
FIG. 9 illustrates the function of the v-s-SGW and the EME instantiated as individual VNF components and grouped according to embodiments of the present invention.

In one embodiment, the functions of the v-s-SGW 902 and the EME 904 can be instantiated as individual VNF Components (VNFCs) and grouped as illustrated in FIG. 9. These individual VNFCs can include a Service Specific Function, for example a CnC function 920, MTC Event Correlator 906, MTC Event Classifier 908, MTC Event Learner 910, MTC Event State Tracker 912, MTC Event to VNF State Mapper 914, MTC Event Coverage Estimator 916 and a VNF Trigger Generator 918. In some embodiments, each VNFC to be grouped in another combination and instantiated and managed as separate VNFs. In some embodiments, multiple copies of one or more of a particular VNFC can be instantiated to meet the computing load and service requirements. Having specific regard to FIG. 9, the output from the VNF Trigger Generator 918 is a VNF state change trigger. Discussion of these VNFCs, for example the CnC, Event Correlator, Event classifier, Event Learner, Event State Tracker, Event to VNF State Mapper, Event Coverage Estimator and VNF Trigger Generator, as well as the interactions therebetween are discussed in further detail below.

Figure 10:
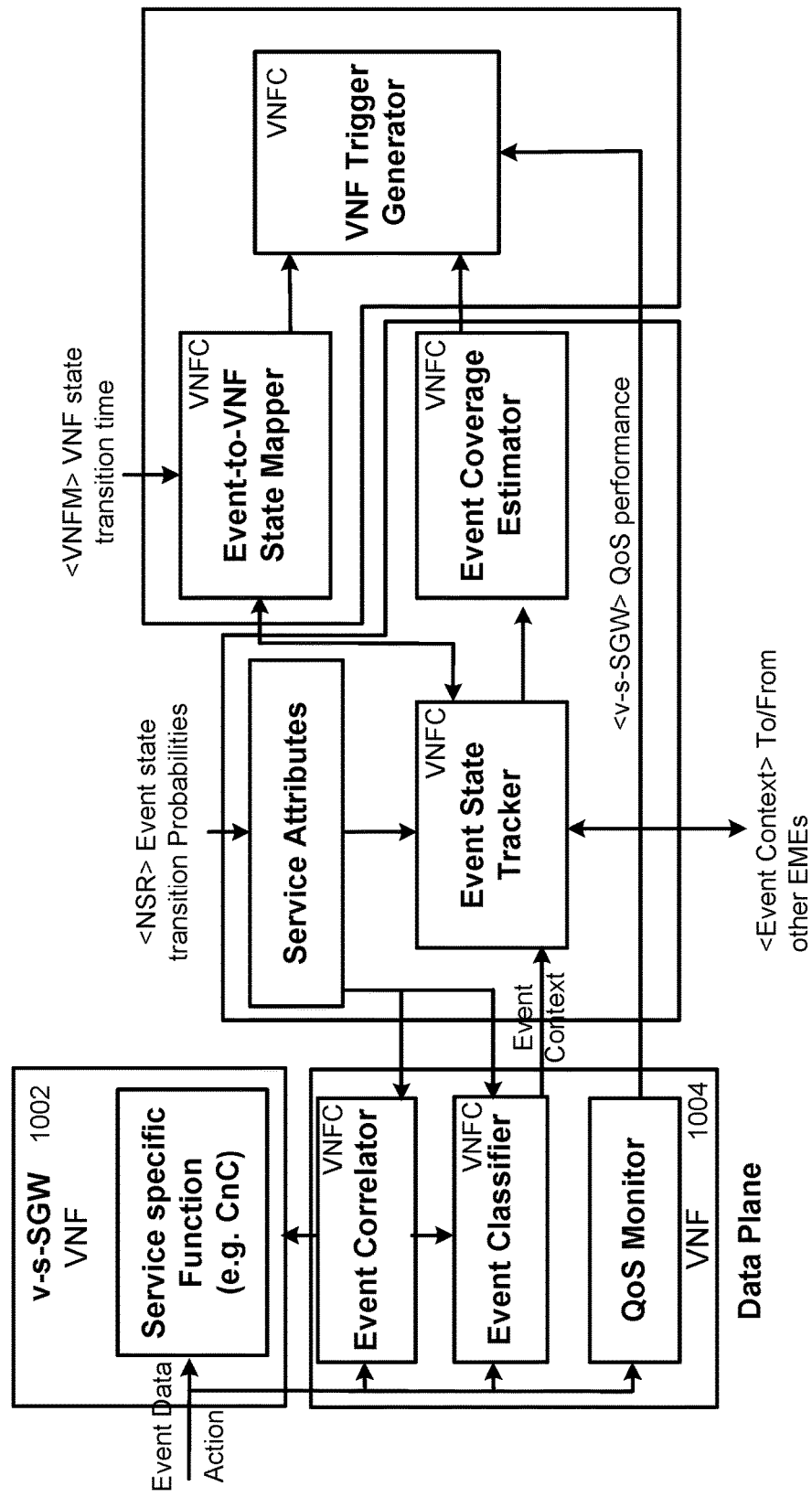
FIG. 10 illustrates the function of the v-s-SGW and the EME instantiated as individual VNF components and grouped according to embodiments of the present invention.

In another embodiment, a number of the functions of the v-s-SGW and the EME as illustrated in FIG. 9, can be reorganized, regrouped and the individual VNFCs can be instantiated and managed as VNFs as illustrated in FIG. 10. In this embodiment, certain functions such as the MTC Event Learner is not used as part of the EME, but the required data such as the state transition probabilities may be obtained from the service attributes. The v-s-SGW 1002 includes the service specific function, for example the CnC. The MTC Event Correlator, MTC Event Classifier can be instantiated within another VNF 1004. Furthermore, the functions of the EME identified in FIG. 9, can be separated into two different VNFs 1008 and 1006. As with FIG. 9, the output from the VNF Trigger Generator is a VNF state change trigger.

Command and Control Function

In embodiments, the CnC function, instantiated as either a VNFC of the v-s-SGW VNF or as a separate VNF, receives packets of measurement data from MTC devices, for example via the one or more BSs associated with the MTC devices. The CnC function subsequently processes the measurement data and determines an actuator response, for example one or more actuator responses to be performed in order to mitigate the MTC event.

Figure 11:
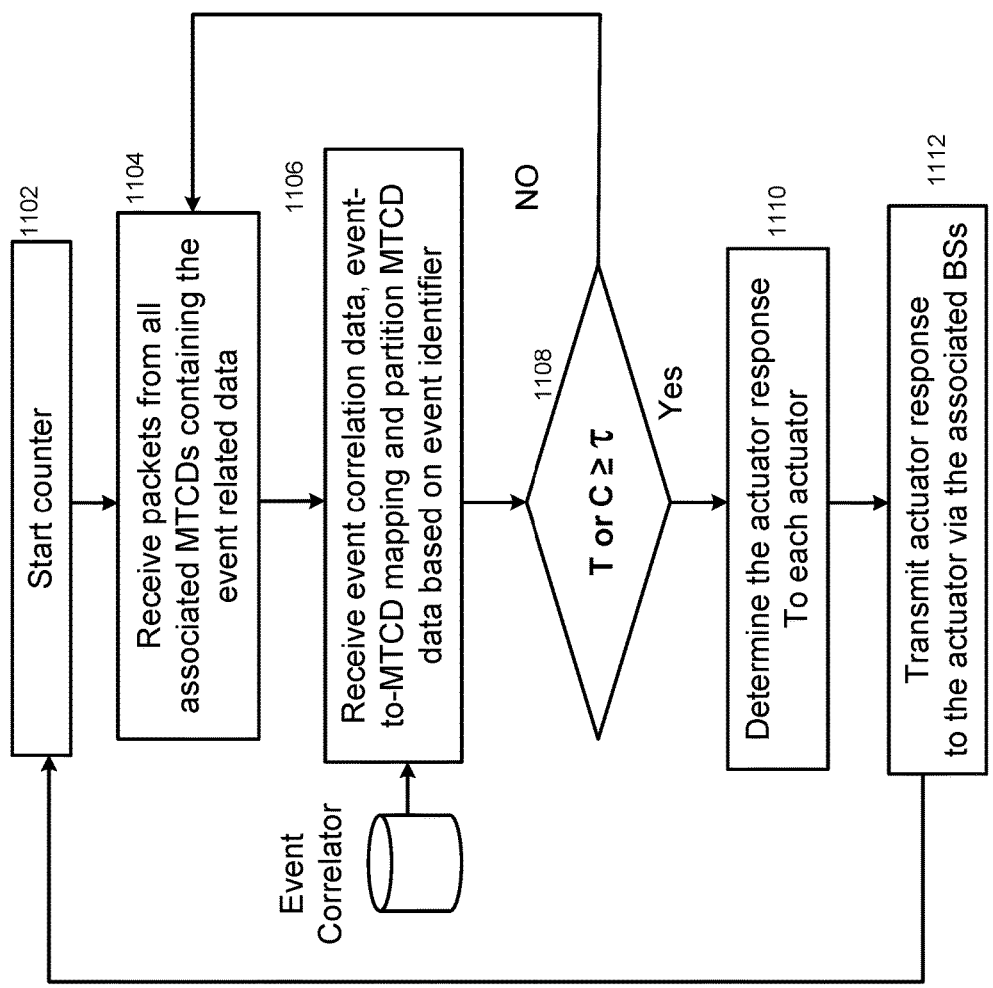
FIG. 11 illustrates a method implemented by the command and control function according to embodiments of the present invention.

In embodiments, the method implemented by the CnC function is illustrated in FIG. 11. A counter 1102 (i.e. counter can be a timer or a packet counter) is set upon receiving the first MTC event related packet from an associated MTC device. This is followed by receiving packets from other MTC devices 1104 which are associated with this particular CnC function. The MTC event-to-MTC device mapping, as determined by an MTC Event Correlator, is used to group the MTC device data based on MTC events, which may be performed using for example by an MTC event identifier 1106. For example, for each MTC event ID the associated MTC devices and their corresponding data are identified. According to embodiments, the preceding steps are repeated so long as the data accumulation counter is valid 1108. Once the counter expires (i.e. timer T or packet counter C exceeds a threshold $\tau$), for each MTC event group, the actuator response may be determined 1110 based on i) MTC event related measurement data, or ii) MTC event correlation data, or iii) Predetermined application layer policy (i.e. rule set) or the like or a combination thereof. The computed actuator response is relayed to the actuators corresponding to each MTC event 1112. The actuator may be either i) co-located with the MTC device which senses the MTC event, ii) placed at location(s) which may be determined via pre-configured look-up tables.

MTC Event State Classifier Function

According to embodiments, an important function of the MTC Event State Classifier (ESC) is to perform quantization on measurement data for conversion into a state space (discrete state set), for example the state of the MTC event, based on predefined state thresholds. The ESC generates MTC event context information containing the MTC event classification ID, MTC event state, MTC devices reporting the MTC event (e.g. MTCD IDs) and forwards this information to the MTC event state tracker function.

Figure 12:
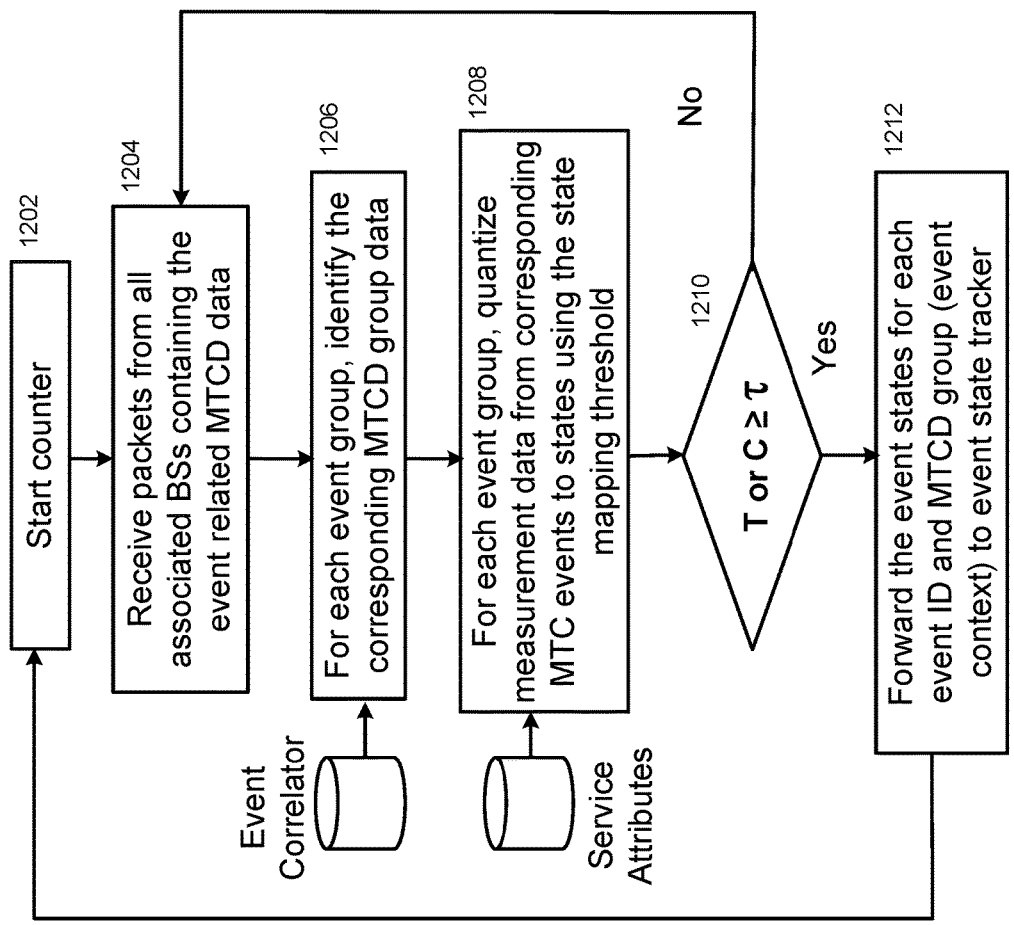
FIG. 12 illustrates a method implemented by the event state classifier function according to embodiments of the present invention.

According to embodiments, FIG. 12 illustrates a method for determining MTC event states. A counter 1202 is set (i.e. counter can be a timer or a packet counter) and subsequently, MTC event related data is received 1204 from a plurality associated MTC devices via the BSs. In some embodiments, the MTC event related data is received from all of the associated MTC devices. The MTC event-to-MTC device mapping, as determined by the MTC Event Correlator, is used to group the MTC device data based on MTC events 1206. The MTC event related data belonging to each group is quantized into a set of discrete states (state space) using the state mapping threshold values 1208. The preceding steps are repeated so long as the data accumulation timer does not exceed a particular threshold 1210 (i.e. timer T or packet counter C does not exceed a threshold $\tau$). Once the counter expires, the MTC event context information is forwarded to the MTC Event State Tracker function 1212.

MTC Event Correlator Function

In embodiments, when performing in-network processing, for example when processing is being performed by the CnC function, it can be desirable to correlate the MTC events and determine the grouping of the MTC devices based on the MTC event correlation so that processing decisions take into consideration data from plural affected MTC devices and may result in mitigating the MTC event in an improved manner. In some embodiments, the correlation of MTC events may result in an optimum response to the MTC event being determined, thereby mitigating same in an efficient way.

In some embodiments, due to changes in the MTC event behaviour, in some instances the MTC devices detecting the same MTC event may be associated to different v-s-SGWs hosting the CnC function. In this case, the processing decision taken by the CnC may not be effective due to incomplete data at each v-s-SGW. According to embodiments, it is desirable to distributively correlate the MTC events in order that the correlation of these MTC events can be used to adapt the logical topology used for mitigation of the MTC event.

Figure 13:
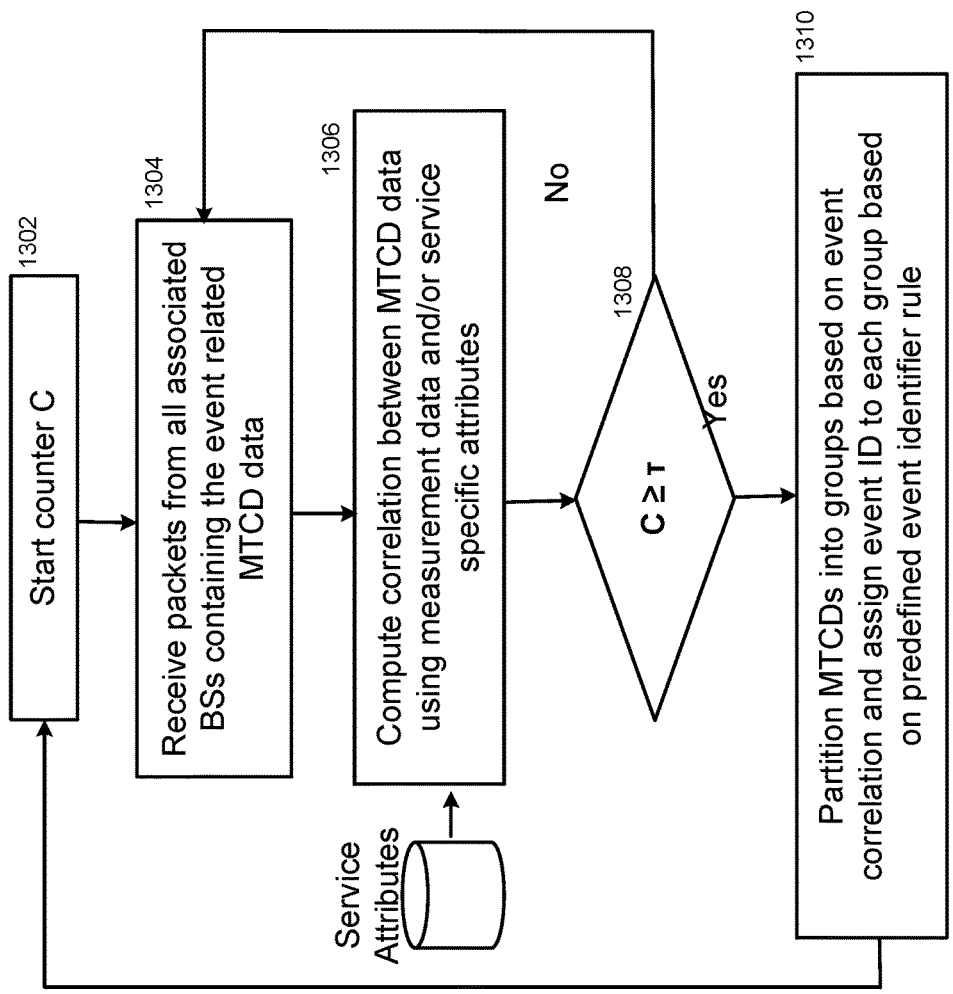
FIG. 13 illustrates a method implemented by the MTC event correlator function according to embodiments of the present invention.

FIG. 13 illustrates a method for determining the MTC event correlation distributively, in accordance with embodiments of the present invention. A counter is set 1302 set and subsequently MTC event related data is received 1304 data from associated MTC devices via their respective BSs. The MTC event correlation 1306 can be performed using a predefined method specified by the MTC service, for by example Pearson minimum distance, statistical indexing. The MTC event correlation can be performed by: analysing the measurement data reported by each MTC device; or service specific attributes, for example, geographic parameters, temporal parameters; or the like or a combination thereof. The preceding steps are repeated so long as the data accumulation counter does not exceed a particular threshold 1308 (i.e. counter C does not exceed a threshold τ). Once the counter expires, for each correlated MTC event and the corresponding MTC device group, a unique MTC event identifier (i.e. Event ID) is determined 1310. In some embodiments, for consistency among plural distributed MTC Event Correlators, the same rule set, which may be available via a service attributes database, are applied in determining the event identifier. However, an alternate but substantially equal rule set may be used. In some embodiments, for consistency all distributed MTC Event Correlators use the same rule set.

MTC Event to VNF State Mapper Function

The MTC Event-to-VNF State Mapper (EVSM) maps the MTC event state to a v-s-SGW VNF state. Based on the VNF transition time, the EVSM determines the time to generate a trigger to transition the VNF.

Figure 14:
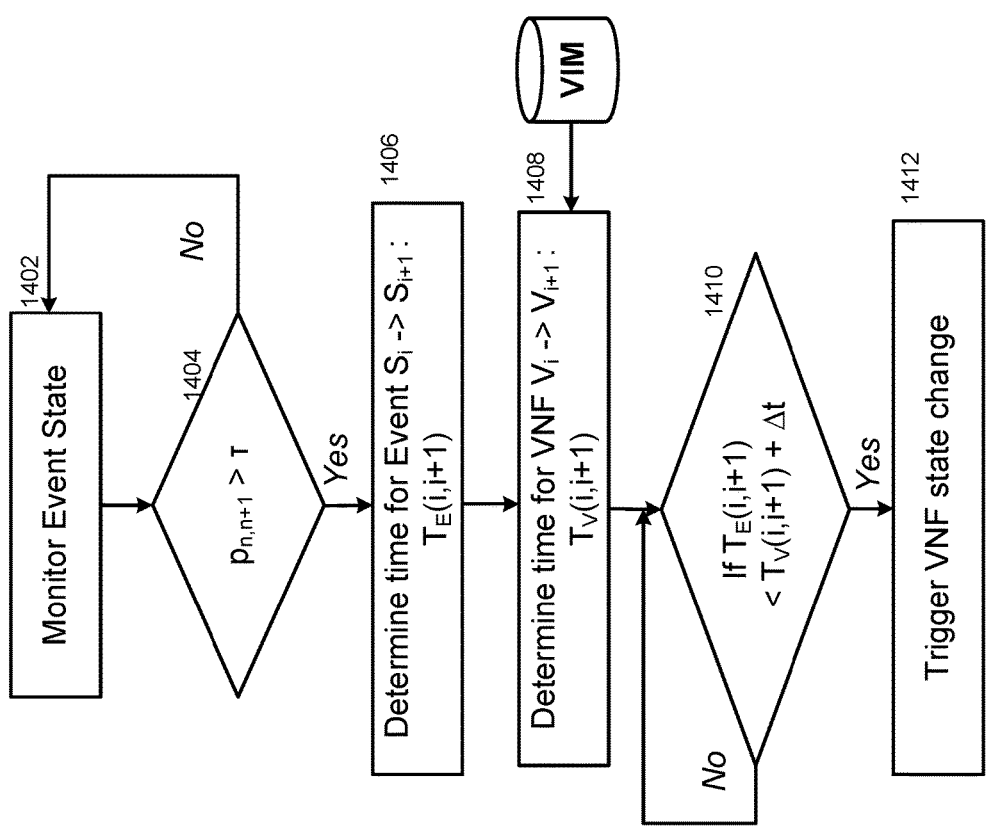
FIG. 14 illustrates a method implemented by the MTC event to VNF mapper function according to embodiments of the present invention.

In embodiments, a method to determine the VNF state change trigger based on the MTC event state is illustrated in FIG. 14. The MTC event state is monitored 1402, for example continuously, periodically, at a sampling rate dependent on the last determined MTC event state or the like, and the transition probabilities can be updated. In some embodiments, the MTC event state can be sampled at a predetermined sample rate, which may be dependent on MTC event type or other parameter or parameters, for example. Subsequently, the MTC State Mapper function can check if the condition for MTC event state change is met namely if an MTC event is about to transition from a current state ($S_i$) to a next state ($S_{i+1}$) where the transition probability $p_{i,i+1}$ exceeds a threshold τ 1404. According to embodiments, if the condition is met, the time for the MTC event state to reach the next critical state, $T_E(i,i+1)$ 1406, is determined by solving:

$$\Pi(n+1) = \Pi(0)P^{n+1}$$

where $\Pi(n) = [\Pi(S''_1), \ldots, \Pi(S''_i)]$ is the MTC state probabilities at time n and P is the MTC state transition probability matrix.

According to embodiments, the updated time for the VNF to reach its next MTC event mapping state, $T_v(i,i+1)$ 1408, is acquired from the virtualized network function manager (VNFM) via the virtualized infrastructure manager (VIM). Subsequently, the Event State Mapper function checks for the time to trigger a VNF transition 1410 by monitoring $T_E(i,i+1) < T_v(i,i+1) + \Delta t$, where $\Delta t$ is a proactive time margin. For example a proactive time margin can be selected to ensure that the VNF transition has been completed in advance of the MTC event transitioning to the next state. If the time to trigger is reached, the MTC Event to VNF State Mapper Function instructs the VNF Trigger Generator to activate a trigger to change VNF state, wherein this trigger can be issued to the VNFM 1412, which is managing the particular VNF.

Event State Learner Function

According to embodiments, a function of the MTC Event State Learner (ESL) is to determine and maintain the MTC event state transition probabilities. The ESL may perform data analytics to compute the MTC state transition probabilities for each MTC event based on i) observation of MTC event state transitioning, for example based on historical data, new data obtained from the MTC Event State Classifier or the like or a combination thereof, ii) actions taken by the v-s-SGW in response to the MTC event states or iii) data acquired from the network service request or a combination thereof.

Figure 15:
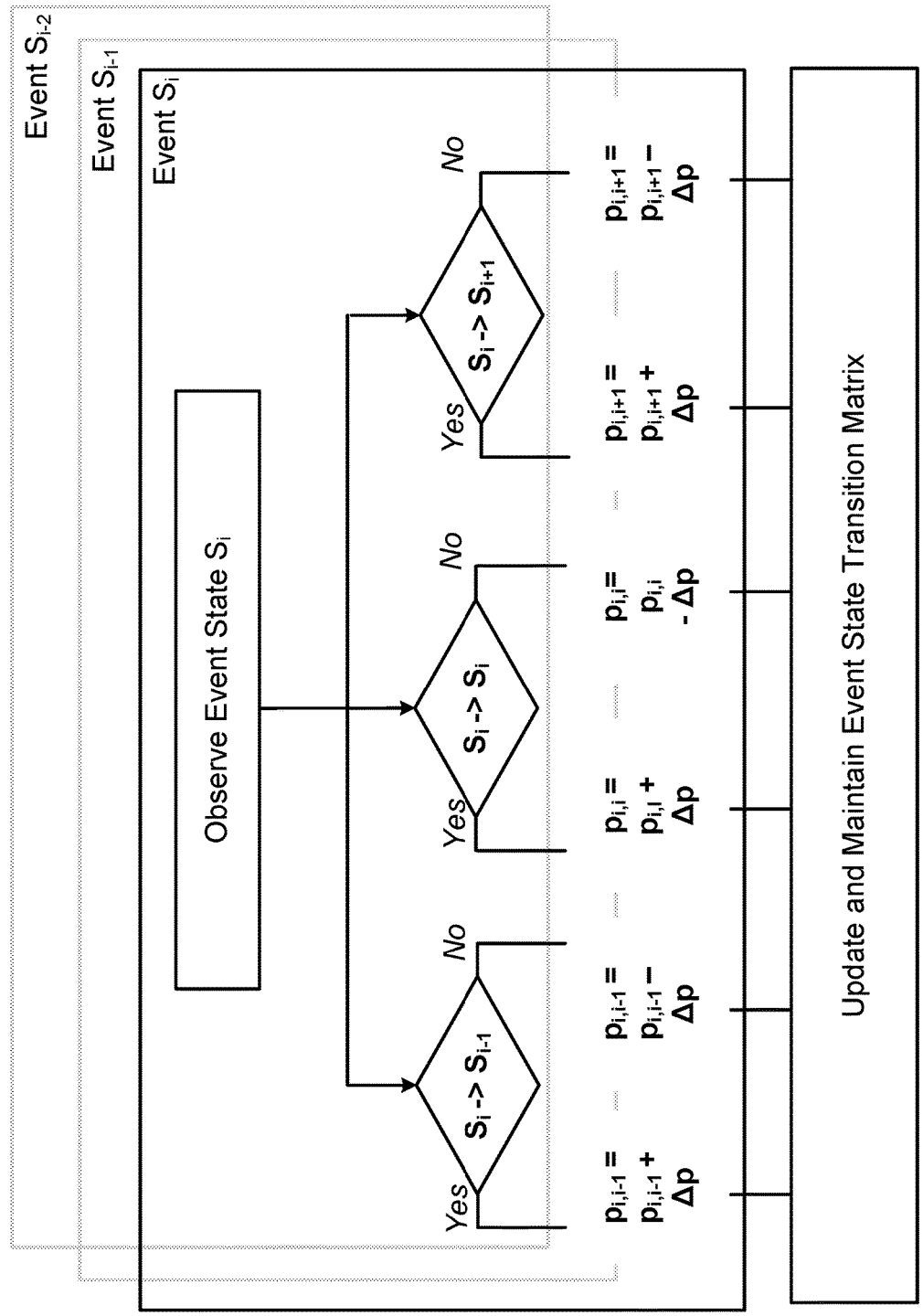
FIG. 15 illustrates a method implemented by the event state learner function according to embodiments of the present invention.

FIG. 15 illustrates a method by which the MTC event state transition probabilities are updated and maintained, in accordance with embodiments of the present invention. For example, a current MTC event state is compared with a previous MTC state and a subsequent MTC state and probabilities can be determined based on the measurement data received relating to each of these MTC event states in order to update and maintain an MTC event state transition matrix. For example, these analytics can provide for the determination and updating of the probabilities of a MTC event state transitions, for example updating $P_{i,i+i}$ indicative of the probability of the MTC event escalating from $S_i$ to $S_{i+1}$; updating $P_{i,i-1}$ indicative of the probability of the MTC event deescalating from $S_i$ to $S_{i-1}$; and updating $P_{i,i}$ indicative of the probability of the MTC event remaining in the current state $S_1$. Using this transition matrix can provide a level of intelligence relating to indicators that can be indicative of MTC event state transitions.

MTC Event State Tracker Function

According to embodiments, the MTC Event State Tracker function maintains and updates the MTC event context.

According to embodiments, the list of attributes tracked may include: i) MTC Event ID—List of active MTC events 1, . . . K (accessible from the MTC event correlators in the v-s-SGWs); ii) MTC device IDs—List of MTC devices reporting MTC event K (accessible from event correlators in the v-s-SGWs); iii) States of MTC events—States of all active MTC events 1, . . . , K (accessible from MTC event state classifiers in the v-s-SGWs); iv) MTC event state transition probabilities (P), steady state probabilities, time for MTC events to transition between states—Matrix for all active MTC events 1, . . . , K (accessible from event learner); v) VNFs and time for VNFs to transition between states—List of candidate VNFs for each MTC event 1, . . . K (accessible from MTC event-to-VNF state mapper); or vi) PoPs and NFVI resource usage estimate—List of PoPs where the candidate VNFs are hosted for each MTC event 1, . . . K (accessible from VNF trigger generator and estimated from service attributes); or a combination thereof.

FIG. 16 illustrates interactions between several components of the MTC Event Management System according to embodiments of the present invention. This embodiment illustrates the tracking of MTC event context. The MTC event identifier (ID), MTC device IDs and MTC event states are accessed from the MTC Event Correlator and MTC Event Classifier 1610 of the associated v-s-SGWs either periodically or each time a new MTC event is detected at a v-s-SGW. This information, for example event context, is provided to the MTC Event Learner if available and the MTC Event State Tracker. If the MTC Event Learner 1612 is available, the state transition probabilities are determined or determined and updated 1620 and the state transition probabilities are provided to the MTC Event State Tracker 1614. The state attributes for each MTC event is tracked by the Event State Tracker 1614 and reported 1622 to the Event-to-VNF State Mapper 1616 if an MTC event state change is detected. Correspondingly, the updated VNF states 1624 and transition times are acquired and the MTC event tracking list is revised. For estimating the MTC event coverage area, the MTC Event State Tracker 1614 can provide the Event-to-MTC device ID mapping 1626. In embodiments, in an hierarchical EME topology, the MTC Event State Tracker can provide the interface among all EMEs.

MTC Event Coverage Estimator Function

According to embodiments, the MTC Event Coverage Estimator accesses the MTC event and MTC device attributes to determine the coverage area associated with each MTC event. This information may be used by the VNF Trigger Generator for embedding in the trigger sent to the VNFM when determining the candidate PoPs where the v-s-SGW VNF can be instantiated. In some embodiments, for mission critical MTC services, for example MTC devices for which an MTC event must not reach a critical state, it is desirable to perform data processing and actuator response computation closer to the MTC event locations so that the round-trip time corresponding to MTC event detection and response provision can be substantially minimized. In addition, since the MTC event coverage area may be varying over time and the state of the MTC event may not be uniform in the entire coverage area, in some embodiments it is desired to estimate the MTC event attributes sufficiently prior to determining the PoPs at which a v-s-SGW will be instantiated for aiding with the mitigation of the MTC event.

Figure 17A:
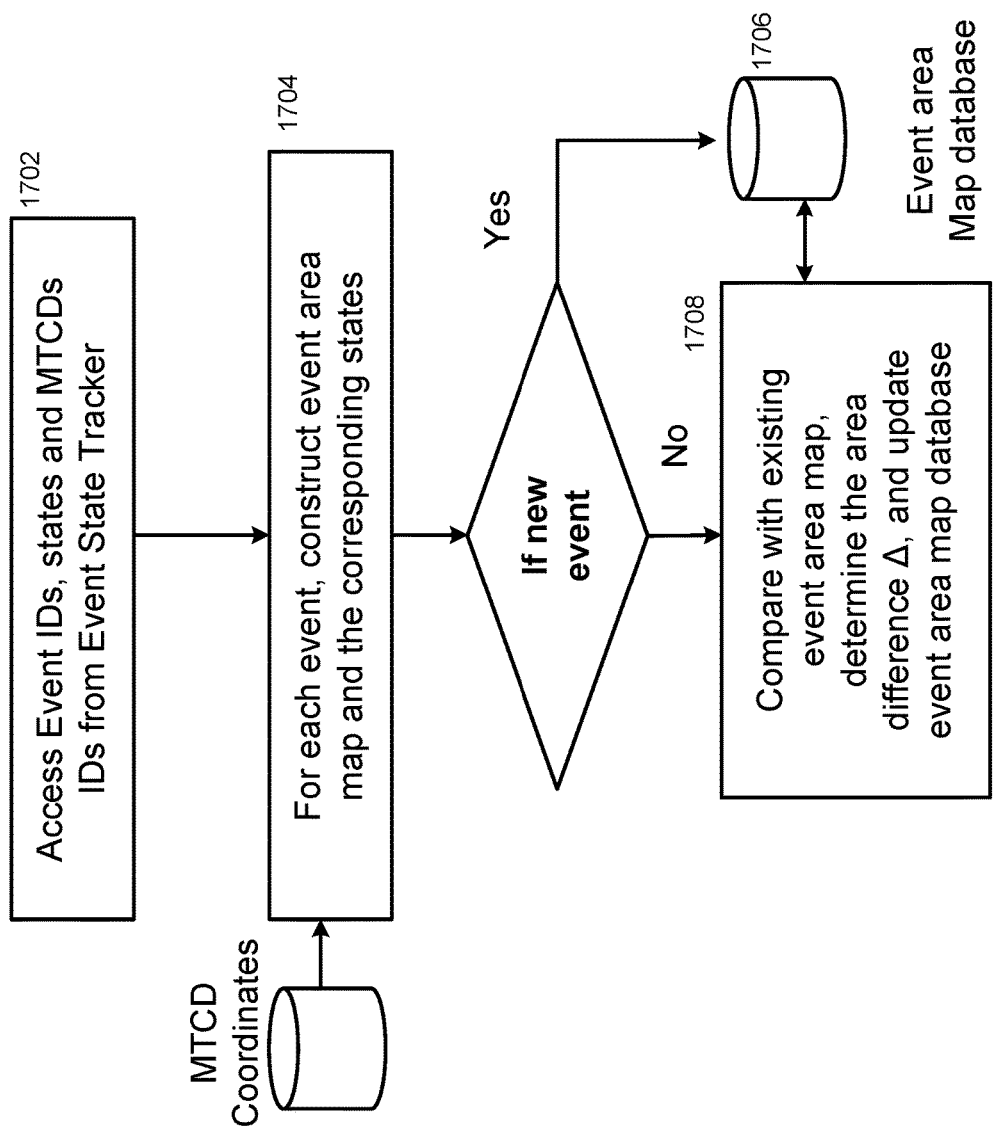
FIG. 17A illustrates a method implemented by the MTC event coverage estimator function according to embodiments of the present invention.
Figure 17B:
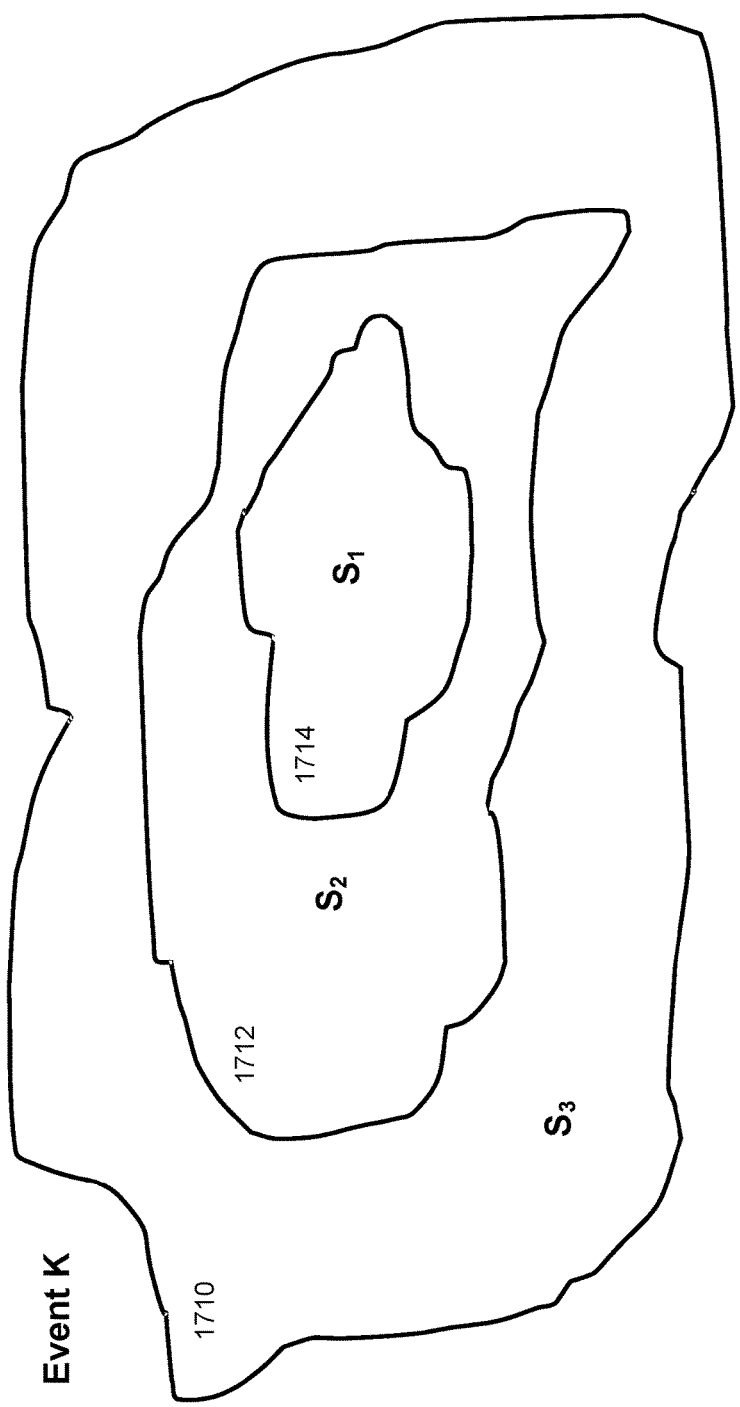
FIG. 17B illustrates the estimated coverage area of MTC event K and the corresponding states in each MTC event region according to embodiments of the present invention.

FIG. 17A illustrates a method for determining the MTC event coverage according to embodiments of the present invention. The MTC event context information pertaining to MTC event ID, MTC event states and MTC device IDs are accessed 1702 from the Event State Tracker. For each MTC event, based on the service attributes which contain the MTC device deployment coordinates and the list of the MTC devices reporting the MTC event, a MTC event area map can be constructed 1704. For new MTC events, the constructed map is updated 1706 in an MTC event area map database. For previously estimated MTC events, the changes in the MTC event area are assessed and updated 1708 in the MTC event area map database. FIG. 17B illustrates an example of the estimated coverage area of MTC Event K and the corresponding MTC event state, $S_1$, $S_2$ and $S_3$ associated with each MTC event region 1714, 1712, 1710, respectively.

VNF Trigger Generator Function

According to embodiments of the present invention, the VNF Trigger Generator function provides functions including: i) for each MTC event, determine the trigger type (i.e. for example a trigger to transition the VNF to a state of on-board, instantiate, activate, start, scale up, stop, reset, delete); ii) for each MTC event, determine the associations between the MTC devices reporting the MTC events and v-s-SGW VNFs (one or set of candidates); iii) Interface to the management and orchestrator (MANO) via VNFM— which allows access the VNF candidate locations, the time to transition the VNFs from state to state, VNF resource consumption, and the like.

Figure 18:
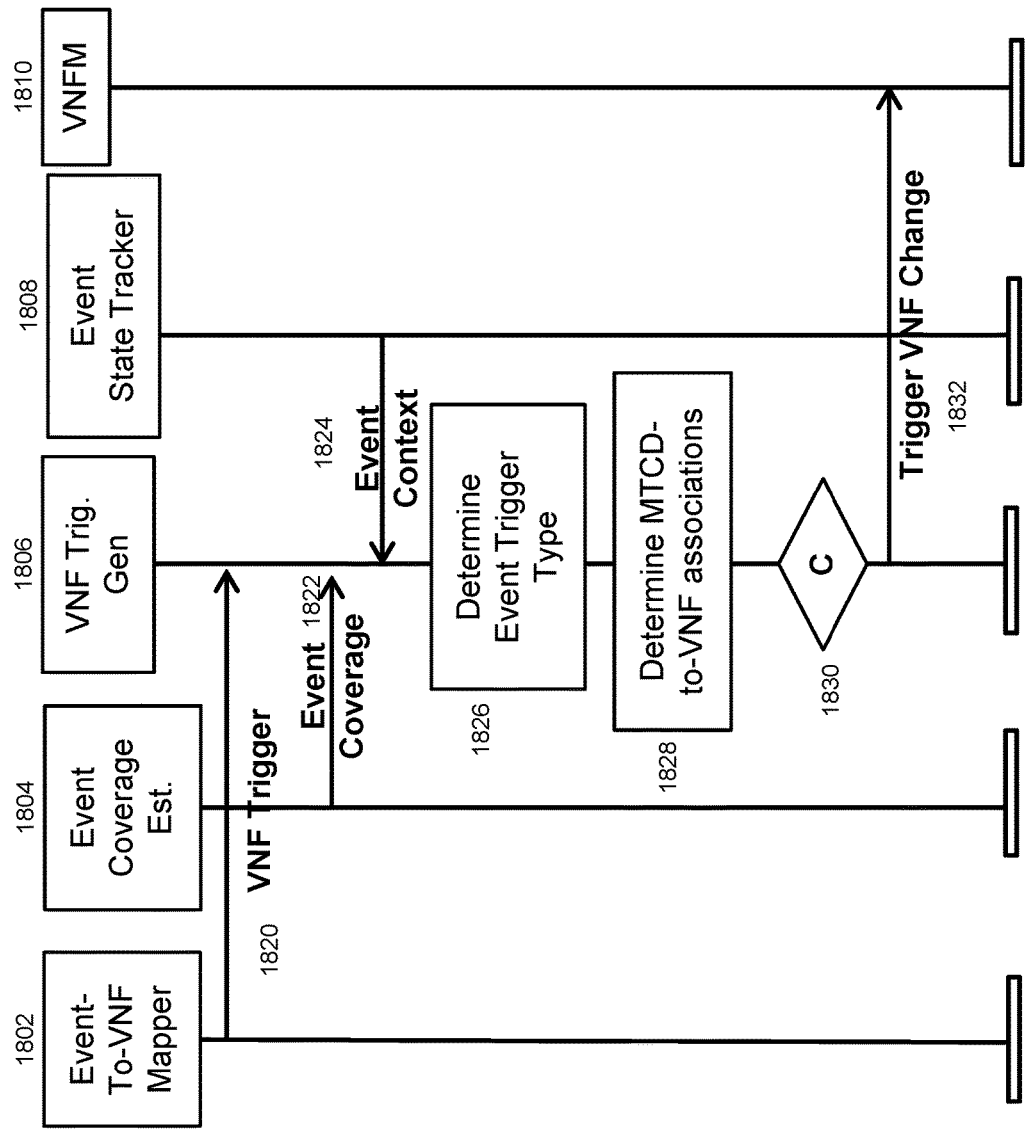
FIG. 18 illustrates interactions between several components of the MTC event management system according to embodiments of the present invention.

FIG. 18 illustrates interactions between several components of the MTC Event Management System according to embodiments of the present invention. This embodiment illustrates the interactions with the VNF Trigger Generator. According to embodiments, a method implemented by the VNF Trigger Generator is illustrated in FIG. 18. A VNF state change trigger 1820 is generated by the MTC Event-to-VNF State Mapper 1802 and the trigger type is assessed 1826 by the VNF Trigger Generator by checking with the MTC Event Coverage Estimator 1804 and the MTC Event State Tracker 1808 which respectively provide details relating to MTC event coverage 1822 and MTC event context 1824. In addition, the VNF Trigger Generator determines MTC device to VNF associations 1828. For new MTC events, which have not been previously reported, the VNF Trigger Generator issues a trigger to on-board the software image of the v-s-SGW VNF to the VNFM 1810 and the set of candidate PoPs where the image has been on-boarded, as reported by the VNFM, is provided to the MTC Event State Tracker. For recurring MTC events, due to a change in the MTC event state, the trigger from the MTC Event-to-VNF Mapper is used along with the MTC event coverage information from the Event State Tracker to determine the associations between the MTC devices and the candidate v-s-SGWs. The required VNF state change may selected as being an increase or decrease in the VNF state level. If the condition set C 1830 (e.g. which can include information relating to Quality of Service (QoS), NFVI resource consumption requirements, or the like) which defines if a VNF state change is required, is met, the VNF Trigger Generator sends a trigger to the VNFM 1832 to change the state of the VNF that is configured to mitigate the MTC event.

Figure 19:
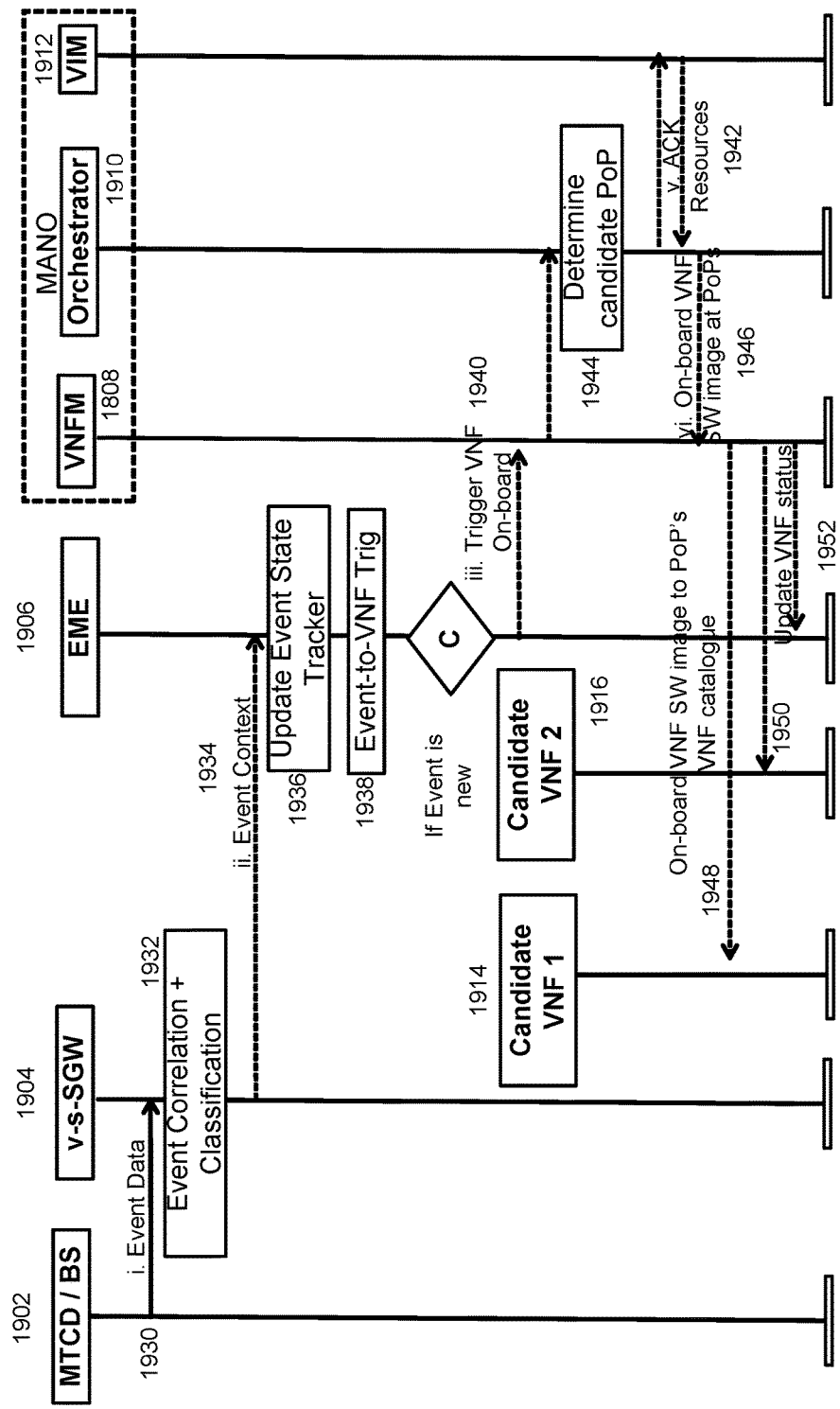
FIG. 19 illustrates a sequence of interactions between several components of the MTC event management system for the handling of new MTC events according to embodiments of the present invention.

FIG. 19 illustrates a sequence of interactions between several components of the MTC event management system for the handling of new MTC events according to embodiments of the present invention. For example, this procedure can provide for handling new MTC events which are un-resolvable, for example the mitigation of the new MTC event is not possible by using existing candidate VNFs. For this case, the software image of the v-s-SGW VNF has to be on-boarded at the VNF catalogues of the new PoPs.

Having regard to FIG. 19 an MTC device 1902 sends event data 1930 to a v-s-SGW 1904 which performs event correlation and classification 1932 using the MTC Event Correlator and MTC Event Classifier. The event context 1934 determined from this correlation and classification is sent to the EME 1906 which updates 1936 the Event State Tracker associated therewith. Upon determination that it is a new MTC event the VNF Trigger Generator 1938 sends instructions in the form of a trigger to the VNFM 1908 to on-board the VNF. The VNFM sends appropriate instructions to the Orchestrator 1910 which subsequently determines candidate PoPs 1934 for instantiation of the VNF, and transmits requests for system resources to the VIM 1912 which subsequently transmits 1942 an acknowledgement of the availability of the resources. The Orchestrator subsequently instructs the VNFM to on-board the VNF software image onto the PoPs 1946. The VNFM then on-boards 1948 and 1950 the VNF software image to the PoPs, namely candidate VNF 1 1914 and candidate VNF 2 1916. The VNFM subsequently transmits to the EME information regarding the updated 1952 status of these VNFs.

Figure 20:
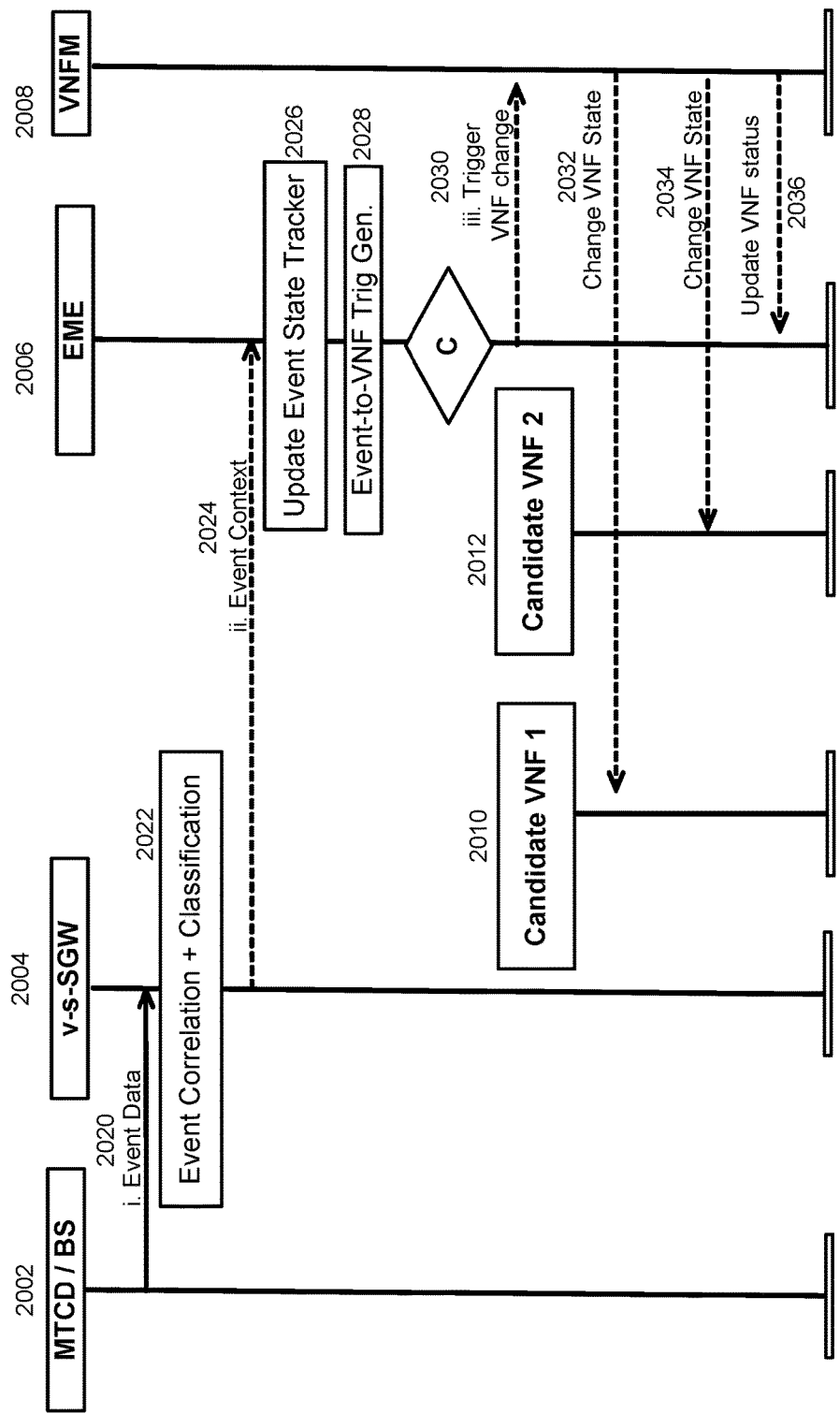
FIG. 20 illustrates a sequence of interactions between several components of the MTC event management system for the handling of recurring MTC events which are non-critical according to embodiments of the present invention.

FIG. 20 illustrates a sequence of interactions between several components of the MTC Event Management System for the handling of recurring MTC events which are non-critical, according to embodiments of the present invention. For example, this procedure can provide for the handling of recurring MTC events which are resolvable, for example the recurring MTC event can be accommodated by existing candidate VNFs. In this embodiment, the MTC event is also non-critical in nature. For this case, if either all or a subset of candidate v-s-SGW VNFs, the trigger for either instantiate, configure, start, stop, reset or terminate is generated, thus resulting in the appropriate transition the VNF function associated with the particular MTC event.

Having regard to FIG. 20 an MTC device 2002 sends event data 2020 to a v-s-SGW 2004 which performs event correlation and classification 2022 using the MTC Event Correlator and MTC Event Classifier. The event context 2024 determined from this correlation and classification is sent to the EME 2006 which updates 2026 the Event State Tracker associated therewith. Upon the EME determining that a VNF state change is required, the VNF Trigger Generator 2028 sends instructions in the form of a trigger 2030 to the VNFM 2008 to change the state of the VNF. The VNFM sends change of state instructions 2032 and 2034 to the respective PoPs, namely candidate VNF 1 2010 and candidate VNF 2 2012 and then send a status update 2036 of these VNFs to the EME.

Figure 21:
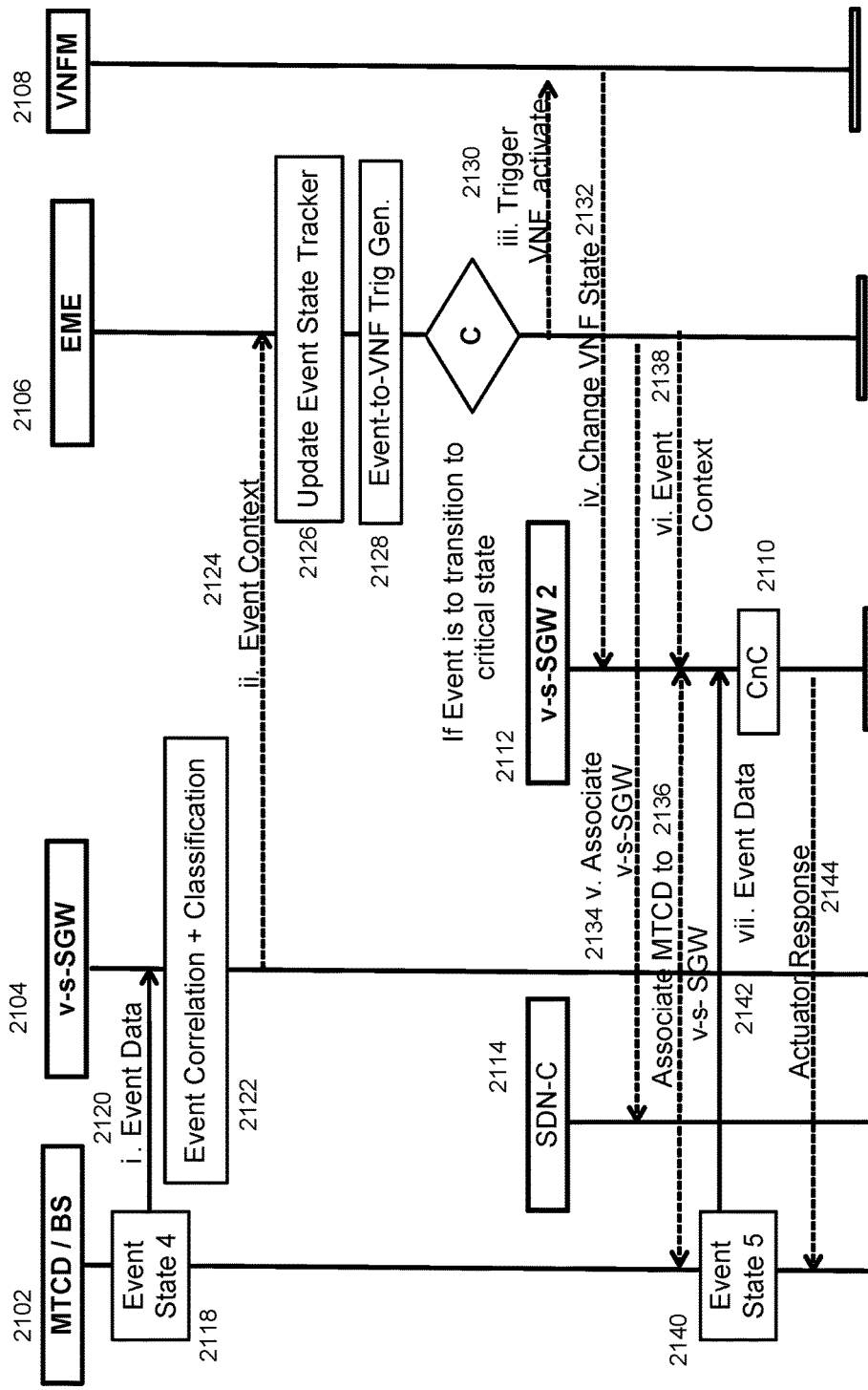
FIG. 21 illustrates a sequence of interactions between several components of the event management system for the handling of recurring MTC events, which are critical according to embodiments of the present invention.

FIG. 21 illustrates a sequence of interactions between several components of the MTC Event Management System for the handling of recurring MTC events, which are critical, according to embodiments of the present invention. For example, this procedure can provide for handling recurring MTC events which are resolvable, for example the recurring MTC event can be accommodated by existing candidate VNFs. In this embodiment, the MTC even is also critical in nature and requires the MTC event data to be processed and a response determined for the mitigation of the MTC event. For this case, in one of the previously selected v-s-SGW, a trigger is sent to the VNFM to activate the VNF. The SDN-C associates the MTC device to the newly activated v-s-SGW prior to MTC event data transmission and processing.

Having regard to FIG. 21 an MTC device 2102 sends event data 2120 to a v-s-SGW 2104 which performs event correlation and classification 2122 using the MTC Event Correlator and MTC Event Classifier. In this instance, the MTC event is in state 4, $S_4$, 2118 which is one state below a critical MTC event. The event context 2124 determined from this correlation and classification is sent to the EME 2106 which updates 2126 the Event State Tracker associated therewith. Upon the EME determining that a VNF state change is required, and that the MTC event may be transitioning into a critical state, $S_5$, the VNF Trigger Generator 2128 sends instructions in the form of a trigger 2130 to the VNFM 2108 to change the state of the VNF, wherein this state change puts the VNF into a configured-activate (I:CA) state. The VNFM sends state transition instructions 2132 to the v-s-SGW 2112 to change the VNF to I:CA state. The EME 2106 sends instructions 2134 to the Software Defined Networking Controller 2114 (SDN-C) to associate with the v-s-SGW 2112.

For clarity, SDN is an architectural framework for creating intelligent programmable networks, where the control planes and the data planes are decoupled, network intelligence and state are logically centralized, and the underlying network infrastructure is abstracted from the application. SDN allows for the management of network services through abstraction of lower-level functionality. Control functions may be separated from forwarding functions for example by controlling the forwarding nodes from a control element. NFV can facilitate the virtualization of entire classes of network node functions. VNF can comprise or operate on one or more virtual machines running on relatively generic servers or computing equipment, such as commercial off-the-shelf hardware capable of being configured to provide a variety of functionalities, as opposed to dedicated hardware for a given functionality. In addition, an SDN-C function may be instantiated within a VIM function and can be configured to provide the forwarding rules to the forwarding switches, for example routers and the like within the physical network architecture, for forwarding and routing packets In effect, the SDN-C serves as a sort of operating system for the network. By taking the control plane off of the network hardware and running it as software instead, the SDN-C facilitates automated network management and can make it easier to integrate and administer applications.

With further reference to FIG. 21 the EME 2106 sends event context 2138 information to the v-s-SGW 2112 and the v-s-SGW subsequently sends information to the MTC device associating 2136 the MTC device with the v-s-SGW. When the MTC event becomes critical ($S_5$), event data 2142 is transmitted to the v-s-SGW 2112 and the CnC 2110 which is operative within the v-s-sSGW determines and sends an actuator response 2144 to the MTC device 2102 in order to mitigate the MTC event, for example the actuator response can provide a means for transitioning the MTC event from a critical state $S_5$ to a sub-critical state for example $S_4$.

Figure 22:
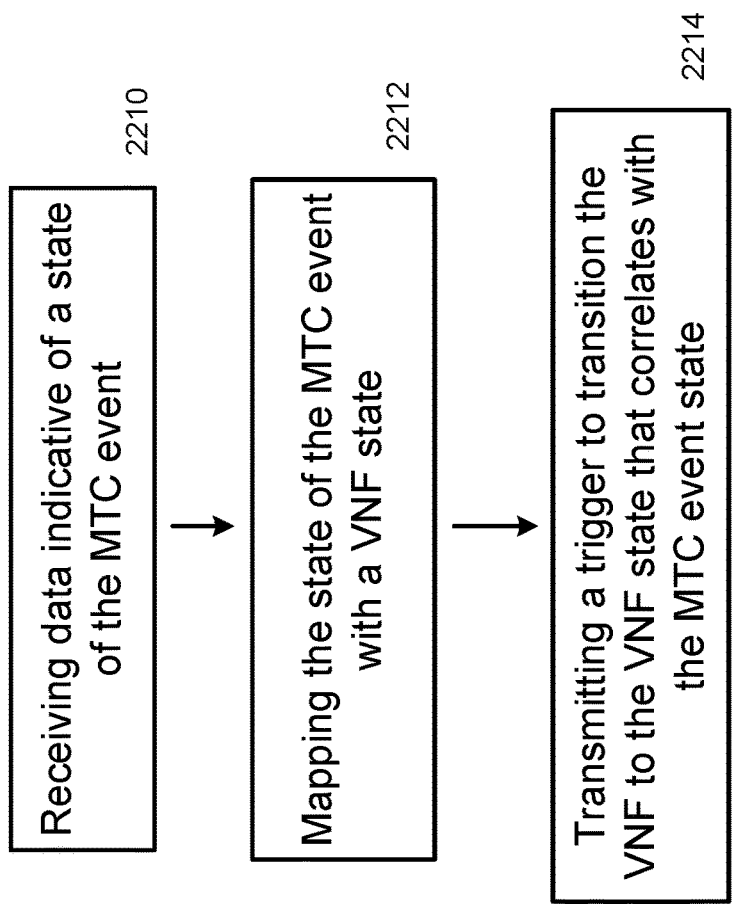
FIG. 22 illustrates a method for management of an MTC event in accordance with embodiments of the present invention.

FIG. 22 illustrates a method for management of an MTC event in accordance with embodiments of the present invention. The method includes receiving 2210, by the Event Management Entity, data that is indicative of a state of the MTC event. In some embodiments, this data include information relating to plural MTC events. The Event Management Entity then performs mapping 2212 of the MTC event to a VNF state, wherein the VNF is configured to mitigate the MTC event. This mapping of the MTC event to the VNF state can enable the timing of the transition of the VNF to an appropriate VNF state, such that the VNF is in a configured and activated state (I:CA) in advance of the MTC state reaching a critical state ($S_5$). The Event Management Entity subsequently transmits 2214 a trigger to the VNF, wherein the trigger is configured to instruct the VNF to transition to the VNF state that correlates with the MTC state.

Figure 23:
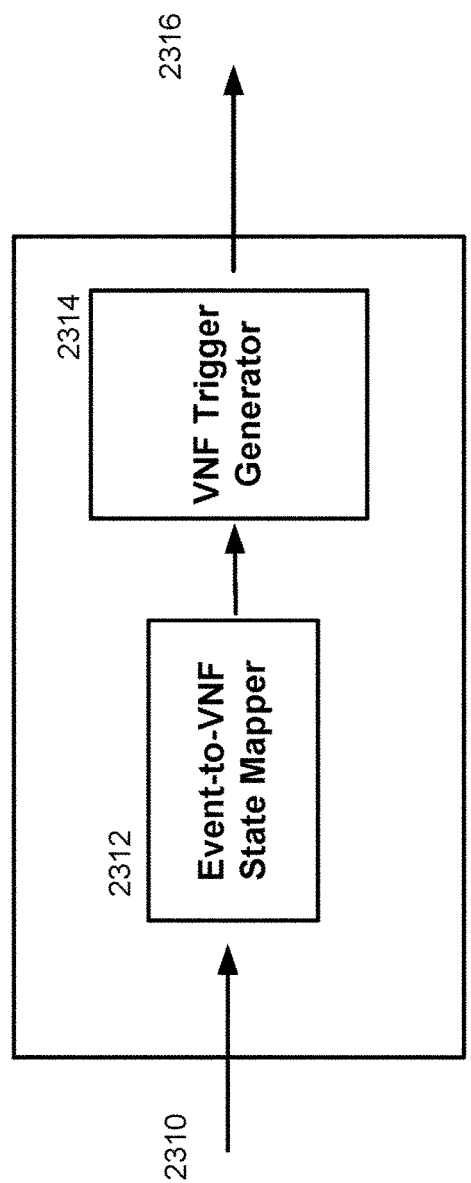
FIG. 23 illustrates a system for management of an MTC event in accordance with embodiments of the present invention.

FIG. 23 illustrates a system for management of an MTC event in accordance with embodiments of the present invention. The system includes a mapper 2312 which is configured to receive data 2310 that is indicative of a state of an MTC event. The mapper is further configured to map the state of the MTC event to a state of a VNF which is configured to mitigate the MTC event. The mapper sends data to the trigger generator, wherein this data is indicative of the mapped VNF state. The trigger generator 2314 is configured to determine and send instructions 2316 to the VNF, wherein these instructions are configured to instruct the VNF to transition into the VNF state which correlates with the MTC event state. In this manner the system is configured to substantially align the timing of the transition of the VNF to an appropriate VNF state, such that the VNF is in a configured and activated state (I:CA) in advance of the MTC state reaching a critical state ($S_5$), thus enabling the mitigation of the MTC event.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Various embodiments of the present invention utilize real and/or virtual computer resources. Such computer resources utilize, at a hardware level, a set of one or more microprocessors operatively coupled to a corresponding set of memory components which include stored program instructions for execution by the microprocessors. Computing resources may be used to provide virtual computing resources at one or more levels of virtualization. For example, one or more given generic computer hardware platforms may be used to provide one or more virtual computing machines. Computer hardware, such as processor resources, memory, and the like, may also be virtualized in order to provide resources from which further virtual computing machines are built. A set of computing resources which are allocatable for providing various computing resources which in turn are used to realize various computing components of a system, may be regarded as providing a distributed computing system, the internal architecture of which may be configured in various ways.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A method for management of a Machine Type Communication (MTC) event, the method comprising:
  receiving, by an Event Management Entity (EME), data indicative of an event context of the MTC event, the event context indicative of classification and correlation of the MTC event; and
  transmitting, by the EME, a VNF state change trigger upon determination that a change in state of a Virtual Network Function (VNF) positioned in proximity and configured to utilize VNF resources to mitigate the MTC event is required.

2. The method according to claim 1, further comprising updating, by the EME, an MTC event state tracker.

3. The method according to claim 1, further comprising receiving data indicative of a status of the VNF.

4. The method according to claim 1, wherein transmitting a VNF state change trigger includes transmitting instructions to activate the VNF.

5. The method according to claim 4, further comprising transmitting, by the EME, event context data indicative of the MTC event.

6. The method according to claim 4, further comprising transmitting, by the EME, instructions to associate the MTC event with a service specific serving gateway associated with the VNF.

7. An Event Management Entity (EME) comprising:
  a network interface for receiving data from and transmitting data to network functions connected to a network;
  a processor; and
  a non-transient memory for storing instructions that when executed by the processor cause the EME to be configured to:
    receive data indicative of an event context of the MTC event, the event context indicative of classification and correlation of the MTC event; and
    transmit a VNF state change trigger upon determination that a change in state of a Virtual Network Function (VNF) positioned in proximity and configured to utilize VNF resources to mitigate the MTC event is required.

8. The EME according to claim 7, wherein the instructions when executed by the processor further cause the EME to be configured to update an MTC event state tracker.

9. The EME according to claim 7, wherein the instructions when executed by the processor further cause the network function to be configured to receive data indicative of a status of the VNF.

10. The EME network function according to claim 7, wherein transmitting a VNF state change trigger includes transmitting instructions to activate the VNF.

11. The EME according to claim 10, wherein the instructions when executed by the processor further cause the EME to be configured to transmit event context data indicative of the MTC event.

12. The EME according to claim 10, wherein the instructions when executed by the processor further cause the EME to be configured to transmit instructions to associate the MTC event with a service specific serving gateway associated with the VNF.

* * * * *